(12) United States Patent
Chiba et al.

(10) Patent No.: US 10,012,917 B2
(45) Date of Patent: Jul. 3, 2018

(54) TONER

(71) Applicant: ZEON CORPORATION, Tokyo (JP)

(72) Inventors: Takeru Chiba, Tokyo (JP); Hiroshi Nakatani, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/584,384

(22) Filed: May 2, 2017

(65) Prior Publication Data

US 2017/0248856 A1    Aug. 31, 2017

Related U.S. Application Data

(62) Division of application No. 14/779,436, filed as application No. PCT/JP2014/058639 on Mar. 26, 2014.

(30) Foreign Application Priority Data

Mar. 27, 2013    (JP) .................. 2013-067257

(51) Int. Cl.
*G03G 9/097*    (2006.01)
*G03G 9/08*    (2006.01)
*C08J 3/00*    (2006.01)
*G03G 9/087*    (2006.01)
(Continued)

(52) U.S. Cl.
CPC .............. *G03G 9/08* (2013.01); *C08J 3/005* (2013.01); *G03G 9/0802* (2013.01); *G03G 9/087* (2013.01); *G03G 9/0839* (2013.01); *G03G 9/08797* (2013.01); *G03G 9/09314* (2013.01); *C08L 2205/00* (2013.01)

(58) Field of Classification Search
CPC ....................................................... G03G 9/08
See application file for complete search history.

(56) References Cited

U.S. PATENT DOCUMENTS 5,476,741 A    12/1995    Nishikiori et al.
5,476,745 A    12/1995    Nakamura et al.
6,562,535 B1    5/2003    Masuo et al.
(Continued)

FOREIGN PATENT DOCUMENTS

JP    5-100485 A    4/1993
JP    7-104514 A    4/1995
(Continued)

OTHER PUBLICATIONS

International Search Report dated Jun. 24, 2014, issued in counterpart Application No. PCT/JP2014/058639 (2 pages).
(Continued)

*Primary Examiner* — Thorl Chea
(74) *Attorney, Agent, or Firm* — Westerman, Hattori, Daniels & Adrian, LLP

(57) ABSTRACT

There is provided a toner comprising a binder resin, a wax, a charge control resin and a colorant. As a result of gas chromatography analysis, a first total amount of components detected in a range of a peak detecting time of hydrocarbons having 5 to 9 carbons is 500 ppm or less in terms of styrene; a second total amount of components detected in a range of a peak detecting time of hydrocarbons having 10 to 18 carbons is 5,000 ppm or less in terms of styrene; and an amount of a component corresponding to a maximum peak of peaks of hydrocarbons having 10 to 18 carbons is 3,000 ppm or less in terms of styrene.

3 Claims, 1 Drawing Sheet

(51) Int. Cl.
*G03G 9/093* (2006.01)
*G03G 9/083* (2006.01)

(56) References Cited

U.S. PATENT DOCUMENTS

| | | |
|---|---|---|
| 2004/0110081 A1 | 6/2004 | Tanaka et al. |
| 2004/0259018 A1 | 12/2004 | Tsuji et al. |
| 2007/0048645 A1 | 3/2007 | Takashima et al. |
| 2008/0044752 A1 | 2/2008 | Nakatani et al. |
| 2009/0035680 A1 | 2/2009 | Ishimoto et al. |
| 2010/0248132 A1 | 9/2010 | Sensui |

FOREIGN PATENT DOCUMENTS

| | | |
|---|---|---|
| JP | 2000-003065 A | 1/2000 |
| JP | 2000-214633 A | 8/2000 |
| JP | 2004-004383 A | 1/2004 |
| JP | 2004-070247 A | 3/2004 |
| JP | 2004-271816 A | 9/2004 |
| JP | 2006-208624 A | 8/2006 |
| JP | 2007-065426 A | 3/2007 |
| JP | 2007-232775 A | 9/2007 |
| WO | 2005/091080 A1 | 9/2005 |
| WO | 2007/141967 A1 | 12/2007 |
| WO | 2009/069462 A1 | 6/2009 |

OTHER PUBLICATIONS

Notification of Transmittal of Translation of the International Preliminary Report on Patentability (Form PCT/IB/338) issued in counterpart International Application No. PCT/JP2014/058639 dated Oct. 8, 2015, with Forms PCT/IB/373 and PCT/ISA/237 (7 pages).
Application and Drawings from parent U.S. Appl. No. 14/775,436, filed Sep. 23, 2015) (90 pages).
Non-Final Office Action dated Jul. 29, 2016 issued in U.S. Appl. No. 14/779,436. (13 pages).

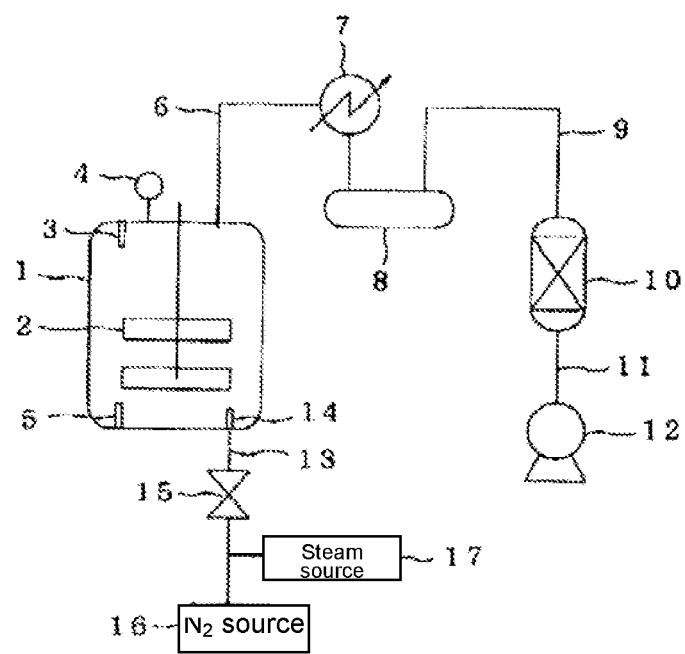

TONER

CROSS-REFERENCE TO RELATED APPLICATIONS

This application is a divisional of copending U.S. patent application Ser. No. 14/779,436, filed on Sep. 23, 2015, and wherein U.S. patent application Ser. No. 14/779,436 is a National Stage application filed under 35 U.S.C. § 371 of International Application No. PCT/JP2014/058639, filed on Mar. 26, 2014, and which is based upon and claims the benefit of priority under 35 U.S.C. § 119(a) of Japanese Patent Application No. 2013-067257, filed on Mar. 27, 2013, the entire contents of which are incorporated herein by reference.

TECHNICAL FIELD

The present invention relates to a toner that can be used for development in an image forming device using electrophotography, such as a copying machine, a facsimile, or a printer.

BACKGROUND ART

In an image forming device of an electrophotographic system (including an electrostatic recording system), such as a copying machine, laser beam printer or facsimile, a developer is used for making an electrostatic latent image formed on a photosensitive member visible. The developer comprises, as a main component, colored resin particles (toner) with a colorant, a charge control agent, a wax and the like dispersed in a binder resin.

The toner is roughly divided into a pulverized toner obtained by a pulverization process and a polymerized toner obtained by a polymerization process. In the pulverization process, a pulverized toner is obtained as colored resin powder by a process, in which a thermoplastic resin is melted and kneaded together with additive components such as a colorant, a charge control agent and a wax, and the resultant kneaded product is pulverized and classified. The thermoplastic resin used in the pulverization process is synthesized by polymerizing a polymerizable monomer in advance. On the other hand, in the polymerization process, a polymerized toner is obtained as colored resin particles by a process, in which a polymerizable monomer composition containing a polymerizable monomer and additive components is polymerized in the presence of a polymerization initiator in an aqueous dispersion medium.

Even in any process, it is difficult to completely polymerize the polymerizable monomer in a polymerization step, and it is inevitable that an unreacted polymerizable monomer remains in the toner. The unreacted polymerizable monomer remaining in the toner (hereinafter also referred to as "the remaining monomer") causes such various problems that (1) the remaining monomer is vaporized out of the toner by heating upon fixing, or the like to worsen a working environment or emit offensive odor, (2) the toner undergoes blocking during its storage, (3) the flowability of the toner is deteriorated to lower the quality of an image formed with such a toner, (4) the toner is easy to cause offset, and (5) the toner is easy to cause toner filming on individual members in an image forming device even though the amount thereof is slight.

The problems caused by the remaining monomer are more serious in the polymerized toner than in the pulverized toner. In the case of the pulverized toner, the content of the remaining monomer is easily reduced by a heat treatment and a drying treatment in a preparation stage and a melting and kneading stage of the thermoplastic resin which will becomes a binder resin. On the other hand, in case of the polymerized toner, the remaining monomer must be removed from the polymer particles containing the additive components such as the colorant, charge control agent and wax. However, the remaining monomer is easy to be absorbed in these additive components, so that it is difficult to reduce the content of the remaining monomer compared with the case of the binder resin alone. In addition, the polymerized toner is easy to aggregate or fuse, so that there is a limit to the demonomer treatment by the heat treatment or the like. In recent years, there has been a strong demand for development of a polymerized toner capable of being fixed at a low temperature for the purpose of achieving speeding-up of printing and formation of full-color images. However, it is extremely difficult in such a low-temperature fixing toner to reduce the content of the remaining monomer while preventing aggregation or fusion.

The polymerized toner contains various volatile organic compounds secondarily produced in the polymerization reaction in addition to the remaining monomer. The volatile organic compounds are vaporized out of the toner by heating upon fixing, or the like, so that the volatile organic compounds have an important adverse influence on the toner properties like the remaining monomer. In particular, when a polymerization initiator high in initiation efficiency is used, volatile organic compounds such as ether compounds are easy to be synthesized by side reactions, and such compounds come to be contained in the resulting polymerized toner. The unreacted polymerizable monomer and the other volatile organic compounds will hereinafter be referred to as volatile organic components (VOC) collectively.

As a method for reducing the content of the remaining monomer or volatile organic compounds in the polymerized toner, it has heretofore been known to polymerize a polymerizable monomer composition comprising a polymerizable monomer and a colorant in an aqueous dispersion medium and then subject a dispersion containing polymer particles formed to a stripping treatment.

As a stripping treatment method using saturated steam, for example, Patent Literature 1 discloses a stripping treatment method, in which after a polymerizable monomer composition including a polymerizable monomer and a colorant is suspension-polymerized, a suspension (dispersion) containing toner particles (polymer particles) is heated, and water is then distilled out of the suspension while saturated steam at 100° C. is introduced into the suspension. Patent Literature 2 discloses a stripping treatment method, in which after a polymerizable monomer composition including a polymerizable monomer and a colorant is suspension-polymerized, saturated steam at a temperature higher than 100° C. is introduced into an aqueous medium (dispersion) containing toner particles. Patent Literature 3 discloses a stripping treatment method, in which a carrier gas is introduced into a polymer dispersion containing toner particles to remove organic volatile components (volatile organic components). In Patent Literature 3, saturated steam is shown as the carrier gas.

However, the stripping treatment method using saturated steam of a high temperature by itself takes a long time to reduce the content of the remaining monomer or volatile organic components, and the degree of reduction is not always sufficient, so that this method is not efficient. In addition, when the high temperature saturated steam is blown into the dispersion containing the polymer particles, the polymer particles are easy to cause partial aggregation and fusion. In particular, when the method of continuously blowing the saturated steam of the high temperature exceeding 100° C. is adopted, the temperature of the dispersion is raised even to 100° C. during the stripping, so that the polymer particles designed to be a low-temperature fixing type are easy to fuse or change the surface properties thereof. Further, according to the method of blowing the saturated steam of the high temperature, the liquid level of the dispersion is greatly raised during the long-time stripping treatment, or it is difficult to control the level of a bubble layer on the liquid level. When water is distilled off during the stripping treatment for inhibiting the rise of the liquid level, the heat for distillation is required, and the process thereof becomes complicated.

On the other hand, as a stripping treatment method using an inert gas, for example, Patent Literature 4 discloses a method, in which in a step of subjecting a dispersion containing polymer particles to a stripping treatment to remove the remaining monomer in the polymer particles, a gas such as an inert gas is blown while a bubble level on the liquid level of the dispersion is controlled. Patent Literature 5 discloses a stripping treatment method, in which a gas composed of air or an inert gas is blown into a dispersion containing colored polymer particles (polymerized toner) in an evaporator, and at this time, the flow rate of the gas and the pressure of a vapor phase in the evaporator are controlled within respective specified ranges.

According to the stripping treatment method of blowing the gas such as the inert gas into the dispersion containing the polymer particles, the content of the remaining monomer can be reduced while preventing the aggregation and fusion of the polymer particles. In addition, the flow rate of the inert gas is controlled, whereby the level of a bubble layer generated on the liquid level of the dispersion can be controlled.

However, the conventional stripping treatment method using the saturated steam or inert gas by itself is not sufficient to efficiently and sufficiently reduce the content of total volatile organic components including the remaining monomer (TVOC content).

In order to solve this problem, Patent Literature 6 discloses a method in which, in a step of polymerizing a polymerizable monomer composition including a colorant and a polymerizable monomer to obtain a dispersion containing polymer particles and subjecting the dispersion to a stripping treatment to remove volatile organic components including an unreacted polymerizable monomer, both an inert gas and saturated steam are used as a gas blown into the dispersion.

CITATION LIST

Patent Literature 1: Japanese Patent Application Laid-Open (JP-A) No. H5-100485
Patent Literature 2: JP-A No. 2004-4383
Patent Literature 3: JP-A No. 2006-208624
Patent Literature 4: JP-A No. 2004-271816
Patent Literature 5: JP-A No. 2007-65426
Patent Literature 6: International Publication No. WO2009/69462 A However, a toner obtained by any one of the above methods disclosed in Patent Literatures 1 to 6, in recent high-speed printing, may cause fog in different environments, filming in continuous printing, and may be poor in printing durability.

SUMMARY OF INVENTION

Technical Problem

In order to solve the above problems, it is an object of the present invention to provide a toner that is less likely to cause fog even when used in either a low-temperature and low-humidity environment or a high-temperature and high-humidity environment, does not cause filming even in continuous printing, and is excellent in printing durability.

Solution to Problem

In order to achieve the above object, the present inventors have intensively studied, and as a result, have found that the above object can be achieved by allowing a toner to contain a charge control resin whose specific component content determined by analyzing, by means of a gas chromatograph, a supernatant obtained by dissolving the charge control resin in an organic solvent and then causing precipitation again is within a specific range.

More specifically, the present invention is directed to a toner comprising a binder resin, a wax, a charge control resin, and a colorant, wherein, as a result of gas chromatography analysis of a supernatant obtained by dissolving the charge control resin in a first organic solvent to prepare a charge control resin solution and then adding a second organic solvent to the charge control resin solution to precipitate a polymer component and to obtain the supernatant, a first total amount of components detected in a range of a peak detecting time of hydrocarbons having 5 to 9 carbons is 500 ppm or less in terms of styrene, a second total amount of components detected in a range of a peak detecting time of hydrocarbons having 10 to 18 carbons is 5,000 ppm or less in terms of styrene, and an amount of a component corresponding to a maximum peak of peaks of hydrocarbons having 10 to 18 carbons is 3,000 ppm or less in terms of styrene.

In the present invention, a content of the charge control resin is preferably 0.3 to 20 parts by mass with respect to 100 parts by mass of the binder resin.

In the present invention, the charge control resin is preferably a positively-chargeable charge control resin.

Advantageous Effects of Invention

According to the present invention, it is possible to provide a toner that contains a charge control resin whose content of volatile organic compounds detected by gas chromatography analysis is a specific value or less, and therefore has a total volatile organic component content (TVOC content) reduced to a low level, has improved environmental charge stability, is less likely to cause fog even when used in either a low-temperature and low-humidity (L/L) environment or a high-temperature and high-humidity (H/H) environment, is less likely to cause filming even in continuous printing, and can exhibit excellent printing durability.

BRIEF DESCRIPTION OF DRAWING

FIGURE is a schematic diagram showing a system of a stripping treatment step adopted in Examples of the present invention.

DESCRIPTION OF EMBODIMENTS

A toner according to the present invention contains a binder resin, a wax, a charge control resin, and a colorant, and wherein, as a result of gas chromatography analysis of a supernatant obtained by dissolving the charge control resin in a first organic solvent to prepare a charge control resin solution and then adding a second organic solvent to the charge control resin solution to precipitate a polymer component and to obtain the supernatant, a first total amount of components detected in a range of a peak detecting time of hydrocarbons having 5 to 9 carbons is 500 ppm or less in terms of styrene, a second total amount of components detected in a range of a peak detecting time of hydrocarbons having 10 to 18 carbons is 5,000 ppm or less in terms of styrene, and an amount of a component corresponding to a maximum peak of peaks of hydrocarbons having 10 to 18 carbons is 3,000 ppm or less in terms of styrene.

Hereinbelow, the toner according to the present invention will be described.

The toner according to the present invention preferably includes colored resin particles containing a binder resin, a wax, a charge control resin, and a colorant.

Hereinbelow, a process for producing colored resin particles used in the present invention, colored resin particles obtained by the production process, a process for producing a toner according to the present invention using the colored resin particles, and a toner according to the present invention will be described in order.

1. Process for Producing Colored Resin Particles

In general, processes for producing colored resin particles are roughly divided into dry processes such as a pulverization process and wet processes such as an emulsion polymerization aggregation process, a suspension polymerization process, and a solution suspension process, but wet processes are preferred in that a toner excellent in printing properties such as image reproducibility is easily obtained. Among such wet processes, polymerization processes such as an emulsion polymerization aggregation process and a suspension polymerization process are preferred in that a toner having a relatively small particle diameter distribution in the micron range is easily obtained. Among such polymerization processes, a suspension polymerization process is more preferred.

In the emulsion polymerization aggregation process, an emulsified polymerizable monomer is polymerized to obtain an emulsion of resin microparticles, and the resin microparticles are aggregated with a colorant dispersion or the like to produce colored resin particles. The solution suspension process is a process in which droplets of a solution, in which toner components such as a binder resin and a colorant are dissolved or dispersed in an organic solvent, are formed in an aqueous medium, and then the organic solvent is removed to produce colored resin particles. These processes can be conducted using their respective known methods.

The colored resin particles used in the present invention can be produced by adopting such a wet or dry process. When the suspension polymerization process preferable among the wet processes is adopted, the following process is conducted.

(A) Suspension Polymerization Process (1) Production Step of Colored Resin Particles A process for producing the toner according to the present invention includes a production step of colored resin particles, including a step of polymerizing a polymerizable monomer composition containing a polymerizable monomer, a colorant, a wax, and a charge control resin in the presence of a polymerization initiator in an aqueous dispersion medium. In this step, the polymerizable monomer composition is polymerized to form colored resin particles. If desired, a step of polymerizing a polymerizable monomer for shell in the presence of the colored resin particles may be added to form core-shell type colored resin particles.

As the Aqueous Dispersion Medium, Water Such as Ion-Exchanged Water is Generally used. However, a dispersion medium with a hydrophilic solvent such as alcohol added to water may also be used if desired. The polymerizable monomer composition may contain various kinds of additives such as a crosslinkable monomer, a macromonomer, a molecular weight modifier, a lubricant and a dispersion aid as needed.

(a) Polymerizable Monomer

In the present invention, the polymerizable monomer refers to a monomer having a polymerizable functional group, and the polymerizable monomer is polymerized to form a binder resin. A monovinyl monomer is used as a main component of the polymerizable monomer. Examples of the monovinyl monomer include aromatic vinyl monomers such as styrene, vinyltoluene and α-methylstyrene; (meth)acrylic acid; (meth)acrylic acid derivatives such as methyl (meth)acrylate, ethyl(meth)acrylate, propyl(meth)acrylate, butyl (meth)acrylate, 2-ethylhexyl(meth)acrylate, cyclohexyl (meth)acrylate, isobonyl(meth)acrylate, dimethylaminoethyl(meth)acrylate and (meth)acrylamide; and monoolefin monomers such as ethylene, propylene and butylene. Here, (meth)acrylic acid means both acrylic acid and methacrylic acid. The other (meth)acrylic acid derivatives should also be understood likewise.

The monovinyl monomers may be used either alone or in any combination thereof. Of these monovinyl monomers, only an aromatic vinyl monomer, or a combination of the aromatic vinyl monomer and a (meth)acrylic acid derivative is preferably used.

When a crosslinkable monomer or crosslinkable polymer is used together with the monovinyl monomer, the hot offset property and storage stability of the resulting toner can be improved. The crosslinkable monomer means a monomer having two or more polymeriable functional groups. As specific examples thereof, may be mentioned aromatic divinyl compounds such as divinylbenzene, divinylnaphthalene and derivatives thereof; ester compounds such as ethylene glycol dimethacrylate, diethylene glycol dimethacrylate and 1,4-butanediol diacrylate, in which two or more carboxylic acids having a carbon-carbon double bond are esterified to alcohol having two or more hydroxyl groups; compounds having two vinyl groups, such as N,N-divinylaniline and divinyl ether; and compounds having three or more vinyl groups, such as pentaerythritol triallyl ether and trimethylolpropane triacrylate.

The crosslinkable polymer is a polymer having two or more polymerizable functional groups in the polymer. As specific examples thereof, may be mentioned esterified products obtained by a condensation reaction of a polymer such as polyethylene, polypropylene, polyester or polyethylene glycol, having two or more hydroxyl groups in a molecule, and an unsaturated carboxylic acid monomer such as acrylic acid or methacrylic acid.

These crosslinkable monomers and crosslinkable polymers may be used either alone or in any combination thereof. The amount of the crosslinkable monomer or polymer used is generally at most 10 parts by mass, preferably 0.01 to 7 parts by mass, more preferably 0.05 to 5 parts by mass, particularly preferably 0.1 to 3 parts by mass, with respect to 100 parts by mass of the monovinyl monomer.

It is preferable to use a macromonomer together with the monovinyl monomer because the high-temperature storage stability and the low-temperature fixing ability of the resulting toner can be reconciled. The macromonomer is a macromolecule having a polymerizable carbon-carbon unsaturated double bond at its molecular chain terminal and is an oligomer or polymer having a number average molecular weight of generally 1,000 to 30,000. When the number average molecular weight falls within the above range, the fixing ability and storage stability of the resulting polymerized toner can be retained without impairing the melt properties of the macromonomer. A preferable macromonomer is one capable of providing a polymer having higher glass transition temperature (hereinafter may be referred to as "Tg") than a polymer obtained by the polymerization of the monovinyl monomer.

As examples of the polymerizable carbon-carbon unsaturated double bond that the macromonomer has at its molecular chain terminal, may be mentioned an acryloyl group and a methacryloyl group. However, the methacryloyl group is preferred from the viewpoint of easy copolymerization.

As specific examples of the macromonomer, may be mentioned polymers obtained by polymerizing styrene, styrene derivatives, methacrylic esters, acrylic esters, acrylonitrile and methacrylonitrile either alone or in combination of two or more monomers thereof; and macromonomers having a polysiloxane skeleton. Among these, hydrophilic macromonomers are preferred, with macromonomers composed of a polymer obtained by polymerizing a methacrylic ester or acrylic ester by itself or in combination thereof being particularly preferred.

When the macromonomer is used, the used amount thereof is generally 0.01 to 10 parts by mass, preferably 0.03 to 5 parts by mass, more preferably 0.05 to 1 part by mass, with respect to 100 parts by mass of the monovinyl monomer. When the amount of the macromonomer used falls within the above range, the fixing ability of the resulting toner is improved while retaining its storage stability. Thus, the macromonomer is preferably used in the amount within the above range.

(b) Colorant

As the colorant, may be used any of various kinds of pigments and dyes used in the field of toners, such as carbon black. As examples of black colorants, may be mentioned carbon black, titanium black and nigrosine-based dyes and pigments; and magnetic particles such as cobalt, nickel, triiron tetroxide, manganese iron oxide, zinc iron oxide and nickel iron oxide. When carbon black is used, that having a primary particle diameter of 20 to 40 nm is preferably used in that the resulting toner can provide images good in image quality, and the safety of the toner in environment is also enhanced. As colorants for color toners, may be used yellow colorants, magenta colorants, cyan colorants, etc.

As the yellow colorants, may be used fused azo compounds, isoindolinone compounds, anthraquinone compounds, azo metal complexes, methine compounds, allylamide compounds or the like. Specific examples thereof include C.I. Pigment Yellow 3, 12, 13, 14, 15, 17, 62, 65, 73, 74, 83, 90, 93, 95, 96, 97, 109, 110, 111, 120, 128, 129, 138, 147, 155, 168, 180, 181, 185, 186 and 213. Besides the above, Naphthol Yellow S, HansaYellow G and C.I. Vat Yellow are mentioned as yellow colorants.

Examples of the magenta colorants include fused azo compounds, diketopyrrolopyrrole compounds, anthraquinone compounds, quinacridone compounds, basic dye lake compounds, naphthol compounds, benzimidazolone compounds, thioindigo compounds and perillene compounds. Specific examples thereof include C.I. Pigment Red 2, 3, 5, 6, 7, 23, 31, 48, 48:2, 48:3, 48:4, 57, 57:1, 58, 60, 63, 64, 68, 81, 81:1, 83, 87, 88, 89, 90, 112, 114, 122, 123, 144, 146, 149, 150, 163, 166, 169, 170, 177, 184, 185, 187, 202, 206, 207, 209, 220, 237, 238, 251, 254, 255 and 269. Besides the above, for example, C.I. Pigment Violet 19 is mentioned as a magenta colorant.

Examples of the cyan colorants include copper phthalocyanine compounds and derivatives thereof, anthraquinone compounds, and basic dye lake compounds. Specific examples thereof include C.I. Pigment Blue 1, 2, 3, 6, 7, 15, 15:1, 15:2, 15:3, 15:4, 16, 17, 60, 62 and 66. Besides the above, for example, Phthalocyanine Blue, C.I. Vat Blue and C.I. Acid Blue are mentioned as cyan colorants.

These colorants may be used either alone or in combination of two or more colorants thereof. The colorant is used in a proportion of generally 0.1 to 50 parts by mass, preferably 1 to 20 parts by mass, with respect to 100 parts by mass of the polymerizable monomer.

(c) Charge Control Resin

One of the main features of the present invention is the use of a specific charge control resin.

As described above, a conventional charge control resin slightly contains remaining volatile organic compounds secondarily produced in its synthesis process etc., and such volatile organic compounds cause various problems such as worsening of working environment due to offensive odor, blocking, and degradation of image quality. The volatile organic compounds are difficult to radically remove even when a stripping method is used, and also cause a printing problem such as fog and filming. Therefore, there are still many points that need to be improved.

The toner according to the present invention contains a charge control resin whose content of volatile organic compounds determinable by gas chromatography analysis is extremely low, and therefore has a TVOC content reduced to a low level, has improved environmental stability, is less likely to cause fog even when used in either a low-temperature and low-humidity environment or a high-temperature and high-humidity environment, is less likely to cause filming even in continuous printing, and can exhibit improved printing durability.

The volatile organic compounds contained in the charge control resin are determined by gas chromatography analysis of a supernatant prepared by a specific method.

Here, the method for preparing a supernatant is a method in which (1) first, the charge control resin is dissolved in a first organic solvent to prepare a charge control resin solution, (2) a second organic solvent is then added to the charge control resin solution to precipitate a polymer component, and (3) a supernatant obtained after the polymer component is precipitated is collected.

More specifically, the above (1) is a step of preparing a charge control resin solution with the use of a first organic solvent that can dissolve the charge control resin, and the above (2) is a step of adding a second organic solvent, in which the solubility of a polymer component contained in the charge control resin is low, to the charge control resin solution to reprecipitate (recrystallize) the polymer component and to elute volatile organic compounds into the solution.

It is to be noted that the polymer component contained in the charge control resin means a polymer component having 50 carbons or more and a molecular weight of 700 or more.

As the first organic solvent, a good solvent for the charge control resin can be used. Examples of the first organic solvent include dimethylformamide and ethyl acetate.

On the other hand, as the second organic solvent, a poor solvent for mainly the polymer component contained in the charge control resin can be used. Examples of the second organic solvent include methanol, ethanol, n-propanol, and i-propanol.

In the above measurement method, a first total amount of components detected in a range of a peak detecting time of hydrocarbons having 5 to 9 carbons is 500 ppm or less in terms of styrene, a second total amount of components detected in a range of a peak detecting time of hydrocarbons having 10 to 18 carbons is 5,000 ppm or less in terms of styrene, and an amount of a component corresponding to a maximum peak of peaks of hydrocarbons having 10 to 18 carbons is 3,000 ppm or less in terms of styrene.

Here, "components detected in a range of a peak detecting time of hydrocarbons having 5 to 9 carbons" specifically mean hydrocarbon compounds that are detected in a range of a peak detecting time of hydrocarbons having 5 to 9 carbons and may contain an atom such as oxygen or nitrogen. Further, "components detected in a range of a peak detecting time of hydrocarbons having 10 to 18 carbons" specifically mean hydrocarbon compounds that are detected in a range of a peak detecting time of hydrocarbons having 10 to 18 carbons and may contain an atom such as oxygen or nitrogen. Further, "component corresponding to a maximum peak of peaks of hydrocarbons having 10 to 18 carbons" (hereinafter, also referred to as "maximum peak component") specifically means a hydrocarbon compound that is detected in a range of a peak detecting time of hydrocarbons having 10 to 18 carbons, shows a maximum peak in the range, and may contain an atom such as oxygen or nitrogen.

When the first total amount of components exceeds 500 ppm in terms of styrene, as shown in Comparative Examples 1 and 2 and Comparative Examples 4 and 5 that will be described later, the amount of TVOCs is large. The first total amount of components is preferably 400 ppm or less, more preferably 350 ppm or less. The first total amount of components may be 0.1 ppm or more.

When the second total amount of components exceeds 5,000 ppm in terms of styrene, as shown in comparative Examples 1 to 3 that will be described later, filming on a photosensitive member mainly caused by contamination is likely to occur. The second total amount of components is preferably 3,000 ppm or less, more preferably 2,000 ppm or less. The second total amount of components may be 1 ppm or more.

As can be seen from a comparison between Comparative Example 4 and Comparative Example 5 that will be described later, when the amount of the maximum peak component exceeds 3,000 ppm in terms of styrene even though the second total amount of components is 5,000 ppm or less in terms of styrene (Comparative Example 4), filming on a photosensitive member due to contamination and fog in a low-temperature and low-humidity (L/L) environment are more likely to occur than when the amount of the maximum peak component is 3,000 ppm or less in terms of styrene (Comparative Example 5). The amount of the maximum peak component is preferably 1,500 ppm or less, more preferably 1,000 ppm or less. The amount of the maximum peak component may be 1 ppm or more.

The measurement conditions of the gas chromatography analysis are shown below by way of example.
Apparatus: GC-2010 (manufactured by SHIMADZU CORPORATION)
Column: TC-WAX (manufactured by GL Sciences Inc.) df=0.5 μm, 0.25 mm I.D.×60 m
Detector: FID
Carrier Gas: Helium (linear velocity: 21.3 cm/sec)
Inlet Temperature: 200° C.
Detector Temperature: 200° C.
Oven Temperature: kept at 100° C. for 2 minutes, then elevated to 150° C. at a rate of 5° C./min, and kept at 150° C. for 6 minutes
Sampling Amount: 2 μL The charge control resin used in the present invention is preferably a positively- or negatively-chargeable charge control resin, because such a charge control resin has high compatibility with the polymerizable monomer and can impart stable charging property (charge stability) to toner particles. From the viewpoint of obtaining a positively-chargeable toner, a positively-chargeable charge control resin is more preferred.

The weight average molecular weight (Mw) of the charge control resin is 4,000 to 50,000, preferably 5,000 to 25,000, more preferably 7,000 to 20,000. If the weight average molecular weight of the charge control resin is too high, droplets of the monomer composition in the aqueous dispersion medium have a broad particle diameter distribution. Further, if the weight average molecular weight is too high, the charge level distribution of the toner becomes broad, so that fog is likely to occur under high-temperature and high-humidity conditions. If the weight average molecular weight of the charge control resin is too low, the toner is poor in flowability, and its storage stability is also deteriorated.

The proportion of a structural unit, to which a functional group that imparts a charging property is bonded, in the charge control resin is usually 0.5 to 20 mass %, preferably 1 to 10 mass %. If this structural unit is too little, charging ability cannot be sufficiently obtained. If this structural unit is too much, the environmental stability of the toner is likely to deteriorate.

The charge control resin used in the present invention is preferably a quaternary ammonium salt group-containing copolymer having a glass transition temperature Tg of 70 to 100° C. The glass transition temperature Tg is more preferably 75 to 100° C., even more preferably 75 to 95° C. It is to be noted that Tg is a value measured by means of a differential scanning calorimeter.

i) Positive Charge Control Resin

In general, the positive charge control resin is preferably a copolymer of a vinyl-based monomer having a functional group that imparts a positive charging property and another vinyl-based monomer copolymerizable therewith. However, the positive charge control resin may be a polymer obtained by polymerizing a vinyl-based monomer having no functional group and then introducing the functional group by a modification treatment. From the viewpoint of compatibility with the binder resin, the positive charge control resin is particularly preferably a copolymer containing a monomer unit having a functional group that imparts a positive charging property, a vinyl aromatic hydrocarbon monomer unit, and a (meth)acrylate monomer unit. When the positive charge control resin is compatible with the binder resin (polymer of the polymerizable monomer) contained in the toner, the toner has a more uniform charging property. From the viewpoint of dispersibility in the polymerizable monomer composition, the positive charge control resin is preferably soluble in a styrene-based monomer.

Examples of the functional group that imparts a positive charging property include a pyridinium group, an amino group, and a quaternary ammonium salt group. Particularly, a quaternary ammonium salt group is preferred in that it effectively functions even in a non-magnetic mono-component developer. The positive charge control resin having a quaternary ammonium salt group has an ion structure represented by —NR$_3^+$·X$^-$, wherein three R groups are each independently a hydrogen atom or a substituent group such as an alkyl group, and X is a halogen atom, a halogenated alkyl group, or a hydrocarbon group (alkyl group, aromatic hydrocarbon group, substituted aromatic hydrocarbon group, or the like) having —SO$_3^-$, —PO$_3^-$, or —BO$_3^-$.

From the viewpoint of achieving a uniform charging property of the toner, the positive charge control resin is preferably a copolymer having a quaternary ammonium salt group, more preferably a copolymer having a vinyl aromatic hydrocarbon monomer unit, a (meth)acrylate monomer unit, and a monomer unit having a quaternary ammonium salt group. The quaternary ammonium salt group-containing polymer can be obtained by polymerization, such as emulsion polymerization, dispersion polymerization, suspension polymerization, or solution polymerization, using the following monomers in the presence of a polymerization initiator and then, if necessary, subjecting the resulting polymer to a quaternization reaction using an appropriate quaternizing agent.

Specific examples of the vinyl aromatic hydrocarbon monomer include styrene, α-methyl styrene, 2-methyl styrene, 3-methyl styrene, 4-methyl styrene, 2-ethyl styrene, 3-ethylstyrene, 4-ethylstyrene, 2-propylstyrene, 3-propylstyrene, 4-propylstyrene, 2-isopropylstyrene, 3-isopropylstyrene, 4-isopropylstyrene, 4-butyl styrene, 4-t-butyl styrene, 2-chlorostyrene, 3-chlorostyrene, 4-chlorostyrene, 2-methyl-α-methyl styrene, 3-methyl-α-methylstyrene, and 4-methyl-α-methylstyrene. Among them, styrene and α-methylstyrene are preferred. These vinyl aromatic hydrocarbon monomers may be used alone or in combination of two or more of them.

Specific examples of the acrylate monomer or the methacrylate monomer include methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, hydroxypropyl (meth)acrylate, and lauryl (meth)acrylate. These (meth)acrylate monomers may be used alone or in combination of two or more of them. The quaternary ammonium salt group-containing (meth)acrylate monomer unit is a structural unit represented by the following formula (I):

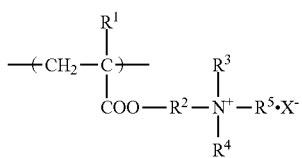

[I]

[wherein R$^1$ is a hydrogen atom or a methyl group, R$^2$ is a linear or branched alkylene group that may be substituted with a halogen and has 1 to 3 carbon atoms, R$^3$ to R$^5$ are each independently a hydrogen atom or a linear, branched, or cyclic alkyl group having 1 to 6 carbon atoms, and X is a halogen atom or benzene or naphthalene that may have a linear, branched, or cyclic alkyl group having 1 to 6 carbon atoms or a halogen atom and has any one of —SO$_3^-$, —PO$_3^-$, and —BO$_3^-$.]

Particularly, X is preferably a halogen atom or a benzenesulfonic acid anion that may have a linear, branched, or cyclic alkyl group having 1 to 6 carbon atoms or a halogen atom. Such a quaternary ammonium salt group-containing (meth)acrylate monomer unit is introduced into the copolymer by, for example, any one of the following methods:

(i) a method in which a vinyl aromatic hydrocarbon monomer, a (meth)acrylate monomer, and an N,N-disubstituted aminoalkyl (meth)acrylate monomer are copolymerized in the presence of a polymerization initiator, and then the amino group is quaternized using a quaternizing agent such as a halogenated organic compound or an acid ester compound;

(ii) a method in which a monomer obtained by converting an N,N-disubstituted aminoalkyl (meth)acrylate monomer into a quaternary ammonium salt, a vinyl aromatic monomer, and a (meth)acrylate monomer are copolymerized in the presence of a polymerization initiator, and then the resulting copolymer is reacted with an organic acid or its derivative to form a salt;

(iii) a method in which a vinyl aromatic monomer, a (meth)acrylate monomer, and a quaternary ammonium salt group-containing (meth)acrylate monomer are copolymerized in the presence of a polymerization initiator; and (iv) a method in which a copolymer of a vinyl aromatic hydrocarbon monomer and a halogenated alkyl(meth)acrylate monomer and a copolymer of a vinyl aromatic hydrocarbon monomer and an amino group-containing (meth) acrylate monomer are mixed together to cause quaternization between the polymers.

Specific examples of the amino group-containing (meth)acrylate monomer include N,N-disubstituted aminoalkyl (meth)acrylates such as dimethylaminomethyl (meth)acrylate, diethylaminomethyl (meth)acrylate, dipropylaminomethyl (meth)acrylate, diisopropylaminomethyl (meth)acrylate, ethylmethyl aminomethyl (meth)acrylate, methylpropylaminomethyl (meth)acrylate, dimethylamino-1-ethyl (meth)acrylate, diethylamino-1-ethyl (meth)acrylate, and dipropylamino-1-ethyl (meth)acrylate. The alkyl group preferably has 1 to 3 carbon atoms.

The quaternary ammonium salt group-containing (meth) acrylate monomer is a (meth)acrylate compound having the above-described —NR$_3^+$·X$^-$ structure. Specific examples thereof include N,N,N-trimethyl-N-(2-methacryloxyethyl) ammonium chloride (DMC; dimethylaminoethylmethyl methacrylate chloride) and N-benzyl-N,N-dimethyl-N-(2-methacryloxyethyl)ammonium chloride (DML: dimethylaminoethylbenzyl methacrylate chloride). These monomers may also be prepared by modifying an amino group-containing (meth)acrylate monomer with a halogenated organic compound into a halogenated quaternary ammonium salt group-containing (meth)acrylate monomer.

Examples of the quaternizing agent include a halogenated organic compound and an acid ester compound. Examples of the halogenated organic compound include: linear, branched, or cyclic alkyl halides having 1 to 6 carbon atoms, such as chloromethane, dichloromethane, and trichloromethane; and aromatic halides such as chlorobenzene, 4-chlorotoluene, and 1-chloronaphthalene. Examples of the acid esters include: alkyl alkylsulfonates such as methyl methylsulfonate and ethyl methylsulfonate; alkyl benzenesulfonates such as methyl benzenesulfonate; alkyl p-toluenesulfonates such as methyl p-toluenesulfonate; phosphates such as trimethyl phosphate; and borates such as trimethoxyborane.

Examples of the organic acid or its derivative include: alkylsulfonic acids such as methylsulfonic acid; aromatic sulfonic acids such as benzenesulfonic acid and p-toluenesulfonic acid; phosphates such as trimethyl phosphate, and borates such as trimethoxyborane.

ii) Negative Charge Control Resin

From the viewpoint of the dispersion stability of droplets of the polymerizable monomer composition, the charge controllability of the toner, image quality, etc., the negative charge control resin is preferably a polymer having a sulfonic acid group, more preferably a copolymer having a structural unit derived from a sulfonic acid group-containing (meth)acrylate monomer and a structural unit derived from another polymerizable monomer, particularly preferably a copolymer having a structural unit derived from a sulfonic acid group-containing (meth)acrylamide monomer, a structural unit derived from a vinyl aromatic hydrocarbon monomer, and a structural unit derived from a (meth)acrylate monomer. Such a copolymer can be obtained by, for example, emulsion polymerization, dispersion polymerization, suspension polymerization, or solution polymerization of a sulfonic acid group-containing (meth)acrylamide monomer, a vinyl aromatic hydrocarbon monomer, and a (meth) acrylate monomer with the use of a polymerization initiator. Among them, solution polymerization is preferred in that a copolymer having a desired weight average molecular weight is easily obtained. As the polymerization process, the same process as described with reference to the positive charge control resin can be adopted.

Specific examples of the vinyl aromatic hydrocarbon monomer and the (meth)acrylate monomer used here are the same as those described with reference to the positive charge control resin. Specific examples of the sulfonic acid group-containing (meth)acrylamide monomer include: acrylamidoalkylsulfonic acids such as 2-acrylamido-1-methylpropanesulfonic acid, 2-acrylamido-2-methylpropanesulfonic acid, 2-acrylamido-n-butanesulfonic acid, 2-acrylamido-n-hexanesulfonic acid, 2-acrylamido-n-octanesulfonic acid, 2-acrylamido-n-dodecanesulfonic acid, 2-acrylamido-n-tetradecanesulfonic acid, 2-acrylamido-2-methylpropanesulfonic acid, 2-acrylamido-2-phenylpropanesulfonic acid, 2-acrylamido-2,2,4-trimethylpentanesulfonic acid, 2-acrylamido-2-methylphenylethanesulfonic acid, 2-acrylamido-2-(4-chlorophenyl)propanesulfonic acid, 3-acrylamido-3-methylbutanesulfonic acid, 2-methacrylamido-n-decanesulfonic acid, and 4-methacrylamidobenzenesulfonic acid; acrylamidocarboxyalkylsulfonic acids such as 2-acrylamido-2-carboxymethylpropanesulfonic acid; acrylamidoheterocyclic group-containing alkylsulfonic acids such as 2-acrylamido-2-(2-pyridine)propanesulfonic acid; and metal salts thereof. These sulfonic acid group-containing (meth) acrylamide monomers may be used alone or in combination of two or more of them.

The polymerization process is not particularly limited, but solution polymerization is preferred in that a copolymer having a desired weight average molecular weight is easily obtained. Examples of a solvent include: aromatic hydrocarbons such as benzene and toluene; saturated hydrocarbons such as n-hexane and cyclohexane; alcohols such as methanol, ethanol, and isopropyl alcohol; nitrogen-containing organic compounds such as nitriles, amines, amides, and heterocyclic compounds; oxygen-containing organic compounds such as ketones, carboxylates, ethers, and carboxylic acids; chlorine-containing organic compounds such as chlorine-substituted aliphatic hydrocarbons; and sulfur-containing organic compounds. As a polymerization initiator, an azo compound, a peroxide, or the like for use in suspension polymerization of the polymerizable monomer, which will be described later, are used. Polymerization conditions are as follows: a polymerization temperature is usually 50 to 200° C., and a polymerization time is usually 0.5 to 20 hours.

The charge control resin that satisfies all the requirements of the first total amount of components, the second total amount of components, and the amount of the maximum peak component may be synthesized from a monomer by a known method or may be prepared by subjecting a conventional charge control resin to a drying treatment.

The drying treatment of a conventional charge control resin may be conducted for 10 minutes to 24 hours under conditions of, for example, a drying temperature of 35 to 80° C. and a pressure of 0.5 to 20 kPa.

Specific examples of the conventional charge control resin that can be used in the present invention through a drying treatment include ACRYBASE FCA-592P (trade name, product of Fujikura Kasei Co., Ltd.), ACRYBASE FCA-681P (trade name, product of Fujikura Kasei Co., Ltd.), ACRYBASE FCA-626N (trade name, product of Fujikura Kasei Co., Ltd.), and ACRYBASE FCA-207P (trade name, product of Fujikura Kasei Co., Ltd.)

In the present invention, the content of the charge control resin is preferably 0.3 to 20 parts by mass with respect to 100 parts by mass of the binder resin. If the amount of the charge control resin added is less than 0.3 parts by mass, there is a case where fog occurs. On the other hand, if the amount of the charge control resin added exceeds 20 parts by mass, there is a case where printing contamination occurs.

In the present invention, the content of the charge control resin is more preferably 0.5 to 15 parts by mass, even more preferably 2 to 5 parts by mass with respect to 100 parts by mass of the binder resin.

(d) Wax

In order to, for example, prevent offset and improve the releasing ability of the resulting toner upon fixing by a heated roll, a wax may be contained in the polymerizable monomer composition. Examples of the wax include polyolefin waxes such as low-molecular weight polyethylene, low-molecular weight polypropylene and low-molecular weight polybutylene; vegetable natural waxes such as candelilla wax, carnauba wax, rice wax, Japan wax and jojoba wax; petroleum waxes such as paraffin wax, microcrystalline wax and petrolatum, and modified waxes thereof; synthetic waxes such as Fischer-Tropsch wax; and esterified products (aliphatic acid ester waxes) of polyhydric alcohols, such as pentaerythritol esters such as pentaerythritol tetramyristate, pentaerythritol tetrapalmitate, pentaerythritol tetrastearate and pentaerythritol tetralaurate, and dipentaerythritol esters such as dipentaerythritol hexamyristate, dipentaerythritol hexapalmitate and dipentaerythritol hexalaurate. These waxes may be used either alone or in combination of two or more compounds thereof.

Among these waxes, Fischer-Tropsch wax and aliphatic acid ester waxes, whose endothermic peak temperatures fall within a range of 30 to 150° C., preferably 50 to 120° C., more preferably 60 to 110° C. as determined from a DSC curve upon heating thereof by means of a differential scanning calorimeter, are particularly preferred from the viewpoint of a balance between the fixing ability and the releasing ability of the resulting toner. The proportion of the wax used is generally 0.1 to 50 parts by mass, preferably 0.5 to 20 parts by mass, more preferably 1 to 10 parts by mass, with respect to 100 parts by mass of the polymerizable monomer.

(e) Polymerization Initiator

As examples of the polymerization initiator for the polymerizable monomer, may be mentioned persulfates such as potassium persulfate and ammonium persulfate; azo compounds such as 4,4'-azobis(4-cyanovaleric acid), 2,2'-azobis[2-methyl-N-(2-hydroxyethyl)propionamide], 2,2'-azobis(2-amidinopropane) dihydrochloride, 2,2'-azobis(2,4- dimethylvaleronitrile) and 2,2'-azobisisobutyronitrile; and peroxides such as di-t-butyl peroxide, dicumyl peroxide, lauroyl peroxide, benzoyl peroxide, t-butyl peroxy-2-ethylhexanoate, t-hexyl peroxy-2-ethylhexanoate, t-butyl peroxypivalate, di-isopropyl peroxydicarbonate, di-t-butyl peroxyisophthalate, 1,1',3,3'-tetramethylbutyl peroxy-2-ethylhexanoate and t-butyl peroxyisobutyrate. Redox initiators obtained by combining these polymerization initiators with a reducing agent may also be used.

Among these polymerization initiators, an oil soluble polymerization initiator, which is soluble in the polymerizable monomer, is preferably selected, and a water soluble polymerization initiator may also be used in combination with the oil-soluble initiator as needed.

As the polymerization initiator used in the present invention, is preferred an organic peroxide having a molecular weight of 90 to 205 and a purity of at least 90%. The molecular weight of the polymerization initiator is more preferably 170 to 200, still more preferably 175 to 195. The purity of the polymerization initiator is indicated as % by mass of a polymerization initiator as a main component and is preferably at least 92%, more preferably at least 95%.

The one-hour half-life temperature of the organic peroxide is preferably 70 to 95° C., more preferably 75 to 95° C., still more preferably 85 to 95° C. because a toner good in printing durability is obtained. The half-life temperature is an index indicating easiness of occurrence of cleavage of the polymerization initiator and indicates a temperature at which the polymerization initiator is decomposed when the polymerization initiator is held at a fixed temperature, thereby reducing the amount of the polymerization initiator to a half of the original amount after a fixed period of time. For example, the one-hour half-life temperature is a half-life temperature when this fixed period of time is 1 hour.

The above-described specific polymerization initiator is used, whereby the amounts of an unreacted polymerizable monomer remaining in the resulting colored resin particles and by-products such as an ether component secondarily produced by the polymerization initiator can be lessened. As a result, a toner, which is excellent in high-temperature storage stability, neither emits offensive odor upon printing nor worsen an ambient environment, and is excellent in printing durability, can be obtained.

As the organic peroxide of the polymerization initiator, a peroxyester is preferred because it is high in initiation efficiency and can reduce the content of the remaining monomer, and a non-aromatic peroxyester (i.e., peroxyester having no aromatic ring) is more preferred.

The organic peroxide used as the polymerization initiator is preferably a non-aromatic peroxyester represented by the following formula (1):

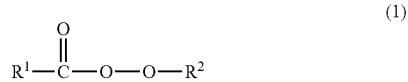

(1)

(in the formula, each of $R^1$ and $R^2$ is respectively an alkyl group having at most 8 carbon atoms).

$R^1$ in the formula (1) is an alkyl group having at most 8 carbon atoms, and preferable specific examples thereof include secondary alkyl groups such as isopropyl, 1-methylpropyl, 1-ethylpropyl, 1-methylbutyl, 2-methylbutyl, 3-methyl-butyl, 1-ethylpropyl, 2-methylhexyl and 2-ethylhexyl. $R^2$ in the formula (1) is an alkyl group having at most 8 carbon atoms, and is preferably t-butyl or t-hexyl, more preferably t-butyl.

Specific examples of the non-aromatic peroxyester represented by the formula (1) include t-butyl peroxy-2-methylhexanoate, t-butyl peroxy-2-ethyl-hexanoate, t-butyl peroxy-2-ethylbutanoate, t-butyl peroxydiethylbutanoate, and t-hexyl peroxypivalate (i.e., t-hexyl peroxy-2,2-dimethylacetate).

The polymerization initiator is used in a proportion of generally 0.1 to 20 parts by mass, preferably 0.3 to 15 parts by mass, more preferably 0.5 to 10 parts by mass, with respect to 100 parts by mass of the polymerizable monomer.

The polymerization initiator may be added into the polymerizable monomer composition in advance. In order to avoid premature polymerization, however, the polymerization initiator is preferably added directly into a suspension after completion of the step of forming droplets of the polymerizable monomer composition or in the middle of a polymerization reaction.

(f) Molecular Weight Modifier

A molecular weight modifier is preferably used upon the polymerization. As examples of the molecular weight modifier, may be mentioned mercaptans such as t-dodecylmercaptan, n-dodecylmercaptan, n-octylmercaptan, 2,2,4,6,6-pentamethylheptane-4-thiol; thiuram disulfides such as tetramethylthiuram disulfide, tetraethylthiuram disulfide, tetrabutylthiuram disulfide, N,N'-dimethyl-N,N'-diphenylthiuram disulfide, and N,N'-dioctadecyl-N,N'-diisopropylthiuram disulfide; and halogenated hydrocarbons such as carbon tetrachloride and carbon tetrabromide. The molecular weight modifier is generally contained in the polymerizable monomer composition prior to the initiation of the polymerization. However, the molecular weight modifier may also be added in the middle of the polymerization. The molecular weight modifier is used in a proportion of generally 0.01 to 10 parts by mass, preferably 0.1 to 5 parts by mass, with respect to 100 parts by mass of the polymerizable monomer. If the amount of the molecular weight modifier is too small, the effect of molecular weight modification is not achieved. If the amount of the molecular weight modifier is too large, the amounts of the remaining monomer and TVOC are increased.

(g) Dispersion Stabilizer

In the present invention, an aqueous dispersion medium, to which a dispersion stabilizer has been added, is generally used. As the dispersion stabilizer, is preferred colloid of a hardly water-soluble metal compound. As examples of the hardly water-soluble metal compound, may be mentioned inorganic compounds including sulfates such as barium sulfate and calcium sulfate; carbonates such as barium carbonate, calcium carbonate and magnesium carbonate; phosphates such as calcium phosphate; metal oxides such as aluminum oxide and titanium oxide; and metal hydroxides such as aluminum hydroxide, magnesium hydroxide and iron(II)hydroxide; and organic compounds including water-soluble polymers such as polyvinyl alcohol, methyl cellulose and gelatin; anionic surfactants; nonionic surfactants; and ampholytic surfactants. Among these, colloids of hardly water-soluble metal hydroxides are preferred because the particle diameter distribution of colored resin particles can be narrowed to improve the brightness of an image to be formed.

The colloid of the hardly water-soluble metal compound is not limited by the production process thereof. However, colloid of a hardly water-soluble metal hydroxide obtained by adjusting the pH of an aqueous solution of a water-soluble polyvalent metal compound to 7 or higher is preferably used, and colloid of a hardly water-soluble metal hydroxide formed by reacting a water-soluble polyvalent metal compound with an alkali metal hydroxide salt in an aqueous phase is particularly preferably used. The colloid of the hardly water-soluble metal compound preferably has number particle diameter distributions, D50 (50% cumulative value of number particle diameter distribution) of at most 0.5 µm and D90 (90% cumulative value of number particle diameter distribution) of at most 1 µm.

The dispersion stabilizer is used in a proportion of generally 0.1 to 20 parts by mass, with respect to 100 parts by mass of the polymerizable monomer. If this proportion is too low, it is difficult to achieve sufficient polymerization stability, so that polymer aggregates are liable to be formed. If this proportion is too high to the contrary, the viscosity of an aqueous solution becomes too high, and the polymerization stability is lowered.

(h) Polymerization Step

A toner of the present invention includes colored resin particles in which a polymer formed by polymerization of a polymerizable monomer becomes a binder resin, and additive components such as a colorant, a charge control agent and a wax are dispersed therein. The colored resin particles may be used as core particles, and a shell formed of a polymer layer may be formed on the core particles to provide core-shell type colored resin particles.

The toner can be obtained in accordance with, for example, the following process. The polymerizable monomer, the wax, the charge control resin, the colorant and other additives are mixed by means of a mixer, and the resultant mixture is subjected to wet grinding by means of a media type wet grinding machine (for example, a bead mill), as needed, to prepare a polymerizable monomer composition. The polymerizable monomer composition is then dispersed and agitated in an aqueous dispersion medium containing a dispersion stabilizer to form uniform droplets (primary droplets having a volume average droplet diameter of about 50 to 1,000 µm) of the polymerizable monomer composition. In order to avoid premature polymerization, it is preferable to add a polymerization initiator to the aqueous dispersion medium after the size of the droplets in the aqueous dispersion medium becomes uniform.

The polymerization initiator is added and mixed with a suspension in which the droplets of the polymerizable monomer composition have been dispersed in the aqueous dispersion medium, and the resultant mixture is further agitated by means of a high-speed rotation shearing type agitator until the droplet diameter of the droplets becomes a fine droplet diameter near to that of the intended toner particles. The suspension containing the thus-formed droplets (secondary droplets having a volume average droplet diameter of about 1 to 12 µm) having a fine droplet diameter is charged into a polymerization reactor to conduct suspension polymerization at a temperature of generally 5 to 120° C., preferably 35 to 95° C. Since a polymerization initiator high in catalytic activity must be used if the polymerization temperature is too low, it is difficult to control the polymerization reaction. If the polymerization temperature is too high, and an additive melted at a low temperature is contained, this additive may bleed on the surface of the resulting toner to deteriorate the storage stability of the toner.

The volume average droplet diameter and droplet diameter distribution of the fine droplets of the polymerizable monomer composition affect the volume average particle diameter and particle diameter distribution of the resulting toner. If the droplet diameter of the droplets is too large, the particle diameter of the toner particles to be formed becomes too large to lower the resolution of an image to be formed. If the droplet diameter distribution of the droplets is too wide, the fixing temperature of the resulting toner varies to cause inconveniences such as occurrence of fog or toner filming. Accordingly, the droplets of the polymerizable monomer composition are desirably formed so as to have almost the same size as that of the toner particles to be formed.

The volume average droplet diameter of the droplets of the polymerizable monomer composition is generally 1 to 12 µm, preferably 2 to 10 µm, more preferably 3 to 9 µm. When it is intended to provide a toner having a particularly small particle diameter for providing a high definition image, it is desirable to make the volume average droplet diameter of the droplets small. The droplet diameter distribution (volume average droplet diameter/number average droplet diameter) of the droplets of the polymerizable monomer composition is generally 1 to 3, preferably 1 to 2.5, more preferably 1 to 2. When particularly fine droplets are formed, it is preferable to adopt a method, in which an aqueous dispersion medium containing the polymerizable monomer composition is passed through between a rotor rotated on its axis at a high speed and a stator surrounding it and having small openings or comb-like teeth.

As the polymerizable monomer, at least one is selected from among the above-mentioned monovinyl monomers. In order to lower a fixing temperature of the resulting toner, a polymerizable monomer or a combination of polymerizable monomers, which permits forming a polymer having a glass transition temperature (Tg) of the order of generally 80° C. or lower, preferably 40 to 80° C., more preferably 50 to 70° C., is preferably selected. When the polymer forming the binder resin is a copolymer in the present invention, the Tg thereof is a calculated value (referred to as "calculated Tg") calculated out according to the kinds and proportions of the polymerizable monomers used.

The suspension polymerization forms colored resin particles with the additive components such as the colorant dispersed in the polymer of the polymerizable monomer. In the present invention, the colored resin particles may be used as a toner. In order to improve the storage stability (blocking resistance), low-temperature fixing ability and melting ability upon fixing of the resulting toner, however, an additional polymer layer may be formed on the colored resin particles obtained by the suspension polymerization to provide a capsule toner having a core-shell type structure.

As a process for forming the core-shell type structure, may be adopted a process in which the colored resin particles are used as core particles, and a polymerizable monomer for shell is additionally polymerized in the presence of the core particles to form a polymer layer (shell) on each surface of the core particles. When a monomer forming a polymer having a Tg higher than the Tg of the polymer component forming the core particles is used as the polymerizable monomer for shell, the storage stability of the resulting polymerized toner can be improved. On the other hand, the Tg of the polymer component forming the core particles is preset low, thereby permitting lowering the fixing temperature of the resulting toner and improving the melting properties. Accordingly, the core-shell type colored resin particles are formed in the polymerization step, thereby providing a toner capable of coping with speeding-up of printing (copying, printing, etc.), formation of full-color images and permeability through OHP (overhead projector).

As polymerizable monomers for forming the core and shell, respective preferable monomers may be suitably selected from among the above-mentioned monovinyl monomers. A mass ratio of the polymerizable monomer for core to the polymerizable monomer for shell is generally 40/60 to 99.9/0.1, preferably 60/40 to 99.7/0.3, more preferably 80/20 to 99.5/0.5. If the proportion of the polymerizable monomer for shell is too low, the effect of improving the storage stability of the resulting toner becomes little. If the proportion is too high, the effect of lowering the fixing temperature of the resulting toner becomes little.

The Tg of the polymer formed from the polymerizable monomer for shell is generally higher than 50° C., but not higher than 120° C., preferably higher than 60° C., but not higher than 110° C., more preferably higher than 80° C., but not higher than 105° C. A difference in Tg between the polymer formed from the polymerizable monomer for core and the polymer formed from the polymerizable monomer for shell is preferably at least 10° C., more preferably at least 20° C., particularly preferably at least 30° C. In many cases, a monomer capable of forming a polymer having a Tg of generally at most 60° C., preferably 40 to 60° C. is preferably selected as the polymerizable monomer for core from the viewpoint of a balance between fixing temperature and storage stability. On the other hand, as the polymerizable monomer for shell, monomers capable of forming a polymer having a Tg higher than 80° C., such as styrene and methyl methacrylate, may be preferably used either alone or in combination of two or more monomers thereof.

In order to produce the toner of the core-shell structure, the polymerizable monomer for shell or an aqueous dispersion thereof is added to the suspension containing the core particles in one lot, or continuously or intermittently. It is preferable from the viewpoint of efficient formation of the shell to add a water-soluble radical initiator at the time the polymerizable monomer for shell is added. It is considered that when the water-soluble polymerization initiator is added at the time the polymerizable monomer for shell is added, the water-soluble polymerization initiator enters in the vicinity of each surface of the core particles into which the polymerizable monomer for shell has migrated, so that the polymer layer is easy to be formed on each surface of the core particles.

As examples of the water-soluble polymerization initiator, may be mentioned persulfates such as potassium persulfate and ammonium persulfate; and azo initiators such as 2,2'-azobis[2-methyl-N-(2-hydroxyethyl)propionamide] and 2,2'-azobis-[2-methyl-N-[1,1-bis(hydroxymethyl)ethyl] propionamide. The amount of the water-soluble polymerization initiator used is generally 0.1 to 50% by mass, preferably 1 to 20% by mass, with respect to 100 parts by mass of the polymerizable monomer for shell.

The average thickness of the shell is generally 0.001 to 1.0 µm, preferably 0.003 to 0.5 µm, more preferably 0.005 to 0.2 µm. If the thickness of the shell is too thick, the fixing ability of the resulting toner is deteriorated. If the thickness is too thin, the storage stability of the resulting toner is deteriorated. The particle diameters of the core particles and the thickness of the shell in the toner can be determined by directly measuring the size and shell thickness of each of particles selected at random from electron photomicrographs thereof when they can be observed through an electron microscope. If the core and shell in each particle are difficult to be observed through the electron microscope, the thickness of the shell can be calculated out from the particle diameter of the core particle and the amount of the polymerizable monomer for shell.

(2) Stripping Treatment Step

The aqueous dispersion medium containing the colored resin particles (including core-shell type colored resin particles) is obtained through production step of colored resin particles described above. This aqueous dispersion medium is provided as a dispersion as it is, or ion-exchanged water or the like is added to the aqueous dispersion medium for adjusting the concentration of the colored resin particles to prepare a dispersion containing the colored resin particles. This dispersion is then subjected to a stripping treatment to remove volatile organic components including an unreacted polymerizable monomer, which remain in the colored resin particles. The stripping treatment is preferably conducted after completion of the polymerization reaction for reducing the content of the unreacted polymerizable monomer to the utmost. If desired, the stripping treatment may be conducted in the latter half of the polymerization reaction and at a stage that a conversion into a polymer is preferably at least 90%, more preferably at least 95% while continuing the polymerization reaction.

Upon the stripping treatment, a defoaming agent may be added to the dispersion for inhibiting excessive bubbling. Upon the stripping treatment, bubbling occurs on the liquid level of the dispersion containing the colored resin particles to form bubbles. When the bubbles excessively increase and overflow an evaporator, a gas circulation line connected to the top of the evaporator is contaminated, or piping is clogged, so that frequent cleaning is required.

As the defoaming agent, may be used a silicone type defoaming agent. However, a non-silicone type defoaming agent is preferably used from the viewpoint of easily providing a toner having excellent properties. As the non-silicone type defoaming agent, may be mentioned at least one non-silicone type defoaming agent selected from the group consisting of oil and fat type defoaming agents, mineral oil type defoaming agents, polyether type defoaming agents, polyalkylene glycol type nonionic surfactants, emulsified products containing oils and fats and a polyalkylene glycol type nonionic surfactant, and emulsified products containing mineral oil and a polyalkylene glycol type nonionic surfactant. Among these non-silicone type defoaming agents, the mineral oil type defoaming agents, polyalkylene glycol type nonionic surfactants, and emulsified products containing oils and fats and a polyalkylene glycol type nonionic surfactant are preferred from the viewpoints of defoaming effect and toner properties.

When the non-silicone type defoaming agent is used as the defoaming agent, a toner having a high charge level can be obtained without adversely affecting the charging property of the toner.

The solid content concentration in the dispersion containing the colored resin particles and supplied to the stripping treatment is within a range of preferably 5 to 45% by mass, more preferably 10 to 40% by mass, particularly preferably 15 to 35% by mass. When a dispersion having a relatively high concentration is obtained in the production step of colored resin particles, water such as ion-exchanged water may be added to the dispersion upon the stripping treatment to prepare a dispersion adjusted to a desired solid content concentration.

The amount of the defoaming agent such as the non-silicone type defoaming agent used is preferably 0.01 to 1 part by mass, more preferably 0.05 to 0.5 parts by mass, with respect to 100 parts by mass of the polymerizable monomer or the colored resin particles. If the amount of the defoaming agent used is too small, it may be difficult in some cases to achieve a sufficient defoaming effect. If the amount is too large, there is a possibility that the toner properties may be adversely affected in addition to saturation of the defoaming effect.

In the present invention, the stripping treatment method for the dispersion containing the colored resin particles comprises using a method of blowing an inert gas (nitrogen, argon, helium or the like) and a method of blowing saturated steam in combination. A method of conducting stripping under reduced pressure while blowing these gasses into the dispersion may also be adopted.

Upon the stripping treatment, the dispersion is heated, whereby volatilization of volatile organic components including the remaining monomer can be helped to increase the recovery efficiency of the remaining monomer. The temperature of the dispersion upon the stripping treatment is preferably not lower than the glass transition temperature (Tg) of the polymer component forming the colored resin particles, but lower than 100° C., more preferably not lower than Tg, but lower than 99° C., still more preferably not lower than (Tg+5° C.), but lower than 95° C. In many cases, the range of 70 to 99° C. can yield good results. The glass transition temperature is a value measured by a differential scanning calorimeter (DSC). When the polymer component has 2 or more Tgs, the lowest Tg is regarded as reference. Upon the stripping treatment, it is desirable that heating conditions and the flow rates of both inert gas and saturated steam are controlled in such a manner that the temperature of the dispersion is kept almost constant at a desired temperature within the above range.

The dispersion is heated by means of an evaporator (evaporating tank) provided with a heat medium-circulating jacket, an evaporator provided with a heat exchanger in the interior thereof, or an evaporator connected to an external heat exchanger. The dispersion may also be heated by blowing a heated gas thereinto. If the temperature of the dispersion is too low, evaporation of the dispersion by the stripping treatment becomes insufficient, and the migration of the remaining monomer in the colored resin particles becomes slow, and so the removal rate of the remaining monomer is lowered. If the temperature of the dispersion is too high, the dispersion stability of the colored resin particles is deteriorated, so that aggregates occur during the treatment, or adhesion of scale to the wall of the evaporator and an agitator increases.

The pressure of a vapor phase within the evaporator may be suitably determined according to a specific method of the stripping treatment. It is preferably selected from within a range of generally 5 to 80 kPa. When the method of conducting stripping under reduced pressure while blowing the gasses is adopted, the pressure within the evaporator is desirably controlled within a range of preferably 5 to 70 kPa, more preferably 10 to 65 kPa, particularly preferably 20 to 60 kPa.

The stripping treatment time varies according to the scale of a treatment apparatus, a treated amount, a specific treating method, a desired level of the content of the total volatile organic components, etc. The treatment time is selected from within a range of generally 0.5 to 50 hours, preferably 1 to 30 hours, more preferably 2 to 20 hours. In many cases, good results can be yielded by the stripping treatment for a short period of time of not shorter than 2 hours, but shorter than 10 hours, further about 3 to 6 hours.

By the stripping treatment, a part of the aqueous dispersion medium in the dispersion, the remaining monomer contained in the dispersion, the remaining monomer in the colored resin particles, other volatile compounds, and the like are removed. The dispersion within the evaporator may be concentrated by the stripping treatment, and, if desired, an aqueous dispersion may be newly added for supplementing the aqueous dispersion medium evaporated. However, according to the method of the present invention, the stripping treatment can be conducted efficiently without adding the supplemental aqueous dispersion medium because the saturated steam is blown into the dispersion. The remaining monomer and aqueous dispersion medium can be collected and reused.

FIGURE illustrates an exemplary stripping treatment system, which can be suitably adopted in the method of the present invention. An agitator equipped with agitating blades 2 is arranged in an evaporator 1. A heat medium-circulating jacket (not illustrated) is preferably provided on the outer wall of the evaporator 1 in such a manner that the temperature within the evaporator can be controlled to a desired temperature. In the evaporator 1, are arranged a non-contact type bubble level meter 3, a pressure gauge 4 and a thermometer 5.

In the specific example illustrated in FIGURE, the system is so constructed that flows of nitrogen gas and steam are put together through a valve 15 and a line 13 from an $N_2$ source (inert gas source) 16 and a steam source (saturated steam source) 17, and these gasses are blown simultaneously into the dispersion from a single blowing tube (inlet tube) 14.

A blower 12 is operated, whereby the confluent gas of the nitrogen gas and steam is blown into the dispersion from the blowing tube 14. A vacuum pump may also be used in place of the blower. While agitating the dispersion (not illustrated) within the evaporator 1 by the agitating blades 2 of the agitator, the temperature of the dispersion is raised to a predetermined temperature, and the confluent gas of the nitrogen gas and steam is then blown into the dispersion from the opening of the blowing tube 14 by operating the blower 12. The nitrogen gas, steam, a part of the aqueous dispersion medium in the dispersion, the remaining monomer, and other volatile compounds are guided to a condenser 7 through a gas line 6, and then guided to a condensing tank 8. Liquid components such as water, which have been condensed and liquified within the condensing tank 8, are recovered therein (a recovering line is not illustrated).

Gas components, from which the liquid components have been removed, are preferably guided to a volatile substance-removing device 10 through a gas line 9. The volatile substance-removing device 10 is, for example, an adsorbing column packed with active carbon, or a bubbling device containing cold water, where the monomer and other volatile components are removed. Thereafter, the gas components are discharged from the blower 12 through a gas line 11. The inert gas such as nitrogen gas may be recycled within the evaporator 1 through a gas circulating line (not illustrated) to reuse it.

A non-contact type bubble level meter 3 is provided at an upper portion within the evaporator 1. The non-contact type bubble level meter 3 is preferably a microwave type level meter. This microwave type level meter is a measuring device for determining a level by measuring a distance between a reference position of a transmitter provided and a surface of a measuring object making use of the fact that the time required for reciprocating a microwave is proportional to a measured distance on the basis of the principle of frequency modulation (FM)-continuous wave (CW) radar. The microwave type level meter is only fitted to a fixing nozzle on the tank, whereby the level of the object to be measured can be measured with high precision without contacting with the object. This microwave type level meter can be used for measurement of a level of a bubble layer generated at a gas-liquid interface of the dispersion containing the colored resin particles.

In the stripping treatment step, the temperature of the inert gas blown into the dispersion is preferably controlled within a range of 50 to 100° C. The temperature of the inert gas is preferably controlled within a range of more preferably 60 to 95° C., still more preferably 70 to 90° C. In order to heat the inert gas, it is only necessary to heat the inert gas source or the inert gas line. The flow rate of the inert gas blown into the dispersion is preferably controlled within a range of 0.05 to 4 L/(hr-kg). The flow rate of the inert gas is more preferably 0.5 to 3.5 L/(hr-kg). The flow rate of the inert gas is a flow rate per kg of the polymer (or the polymerizable monomer composition used) contained in the dispersion. From the viewpoints of efficiency of the stripping treatment and prevention of aggregation or fusion of the colored resin particles, both temperature and flow rate of the inert gas are preferably controlled within the above-described respective ranges.

In the stripping treatment step, the temperature of the saturated steam blown into the dispersion containing the colored resin particles is preferably controlled within a range of 90 to 180° C. The temperature of the saturated steam is controlled within a range of more preferably 95 to 155° C., still more preferably 98 to 130° C. The flow rate of the saturated steam blown into the dispersion is preferably controlled within a range of 0.05 to 1 kg/(hr-kg). The flow rate of the saturated steam is more preferably 0.07 to 0.8 kg/(hr-kg), still more preferably 0.08 to 0.5 kg/(hr-kg). The flow rate of the saturated steam is a flow rate per kg of the polymer (or the polymerizable monomer composition used) contained in the dispersion. From the viewpoints of efficiency of the stripping treatment and prevention of aggregation or fusion of the colored resin particles, both temperature and flow rate of the saturated steam are preferably controlled within the above-described respective ranges. The saturated steam means steam in which water and steam coexist in an equilibrium state.

According to the method of the present invention, colored resin particles whose amount of TVOCs is preferably 6.5 mg/hr or less, more preferably 4.0 mg/hr or less can be collected in a collecting step after the stripping treatment step. The lower limit of the amount of TVOCs is usually 0.1 mg/hr.

When saturated steam of a high temperature is blown into the dispersion over a long period of time, aggregation or fusion of the colored resin particles is easy to occur, and difficulty is encountered on control of the temperature and amount of the dispersion. The method of continuously blowing the saturated steam of the high temperature into the dispersion to keep the temperature of the dispersion at 100° C. easily causes fusion of colored resin particles or change of surface properties thereof. On the other hand, according to the method of the present invention, the amount of the saturated steam blown can be reduced because both blowing of the inert gas and blowing of the saturated steam are used in combination, whereby these various problems can be relieved or overcome. The inert gas and saturated steam are used in combination, whereby the stripping treatment can be stably performed without causing the problem of aggregation or fusion by reducing the amount of the saturated steam blown even when the toner is designed to be a low temperature fixing type.

The inert gas and saturated steam are used in combination, and the flow rate of the inert gas is mainly changed, thereby permitting rapidly coping with variations in the level of a bubble layer generated on the liquid level of the dispersion.

According to the method of using the saturated steam alone, it is difficult to lower the level of the bubble layer to an allowable height rapidly when the level of the bubble layer rapidly becomes too high even if the amount of the saturated steam blown is reduced, since the temperature of the dispersion cannot be rapidly lowered.

The method of the present invention not only can prevent the level of the bubble layer from becoming excessively high due to, for example, addition of a defoaming agent, but also can increase the removal efficiency of the volatile organic components by heightening the level of the bubble layer to an allowable height. When the level of the bubble layer becomes too high or too low, the flow rate of the inert gas is mainly controlled, whereby the level of the bubble layer can be controlled to a desired level. Contamination of an apparatus and clogging of piping by adhesion of bubbles can be thereby prevented to relieve the necessity of cleaning.

When a stripping treatment is conducted by blowing a gas such as an inert gas or saturated steam into the dispersion, the level of the bubble layer at the initial stage of the stripping treatment often becomes a maximum value. Therefore, when the gas is blown at a fixed flow rate from the beginning to conduct the treatment, the level of the bubble layer is gradually lowered. When the level of the bubble layer is lowered, it is possible to vary conditions for the stripping treatment so as to increase the removal efficiency of the volatile organic components by, for example, increasing the flow rate of the gas. In order to increase the removal efficiency of the volatile organic components including the remaining monomer, the dispersion is sufficiently bubbled to heighten the level of the bubble layer on the liquid level of the dispersion, resulting in accelerating volatilization and migration into bubbles of the volatile organic components at a gas-liquid interface. Accordingly, the level of the bubble layer is desirably heightened within an allowable range, not lowered to the utmost.

When the bubble level during the stripping treatment is detected by a bubble level meter such as a non-contact type bubble level meter, the conditions for the stripping treatment can be controlled on the basis of the bubble level information detected. When the lowering of the level of the bubble layer is known by the bubble level information, for example, the flow rate of the gas can be increased corresponding to the lowering. It is preferable to increase the flow rate of the gas blown in the dispersion step by step or continuously under conditions that the level of the bubble layer on the liquid level of the dispersion stays in a vapor phase within the evaporator.

When the flow rate of the saturated steam of the high temperature is increased corresponding to the lowering of the level of the bubble layer, the aggregation or fusion of the colored resin particles is easy to occur, and the temperature and amount of the dispersion are increased. On the other hand, when the method of using the inert gas and saturated steam in combination is adopted, the level of the bubble layer can be rapidly kept to a predetermined height by controlling both flow rates or mainly controlling the flow rate of the inert gas.

The level of the bubble layer is indicated as a bubble layer level (%) by expressing the height of bubbles from the bottom by percent on the basis of the height (100%) of the evaporator. When the liquid level of the dispersion within the evaporator is located at a position of 60% of the height thereof, the level of the bubble layer comes to exceed 60%. A case where the level of the bubble layer is 100% is under the conditions that the bubble level on the liquid level of the dispersion stays in the vapor phase within the evaporator.

However, in order not to contaminate an exhaust line, a condenser, etc. with bubbles, the level of the bubble layer is desirably controlled to generally at most 95%, preferably at most 90%, more preferably at most 85%. On the other hand, the level of the dispersion is controlled to generally at most 80%, preferably at most 70%, more preferably at most 60% on the basis of the height (100%) of the evaporator. The lower limit thereof is about 40% or 50%.

In the present invention, it is desirable to adopt a method, in which the dispersion is subjected to the stripping treatment within the evaporator in the stripping treatment step, and the conditions for the stripping treatment are controlled in such a manner that the level of the bubble layer on the liquid level of the dispersion does not exceed 95% based on the height of the evaporator, and the lowering of the bubble level from the beginning of the stripping treatment is within 10%. The lowering rate of the level of the bubble layer is also a value based on the height of the evaporator.

The flow rate of the inert gas is preferably increased step by step or continuously as the stripping treatment step proceeds. A ratio of an average flow rate in the latter half of the stripping treatment step to an average flow rate of the former half of the stripping treatment step is within a range of preferably 1.05 to 10, more preferably 1.2 to 6, particularly preferably 1.5 to 5.

The inert gas and saturated steam may be blown into the dispersion as independent separate flows. Alternatively, both flows may be put together and blown into the dispersion as one flow. In order to blow the inert gas and saturated steam into the dispersion as independent separate flows, two blowing tubes are provided at the bottom of the evaporator. In order to put the inert gas and saturated steam together and blow them into the dispersion as one flow, one blowing tube is provided at the bottom of the evaporator.

These gasses may be blown into the dispersion according to a method that a blowing tube is formed into a double-tube structure, and the inert gas and saturated steam are passed through the inner tube and the outer tube thereof, respectively. When the heights at the outlets of the inner tube and outer tube in the blowing tube of the double-tube structure are made even, both gasses are put together at the outlets. When the height at the outlet of the inner tube in the blowing tube of the double-tube structure is projected, both gasses are not put together at the outlets, or the time both gasses are put together can be slowed.

When the method of putting the inert gas and saturated steam together to blow them into the dispersion is adopted, the aggregation or fusion of the colored resin particles and the change of surface properties thereof can be relieved compared with the case where the saturated steam is blown into the dispersion as a separate flow. The reason for it is that the degree of contact of the saturated steam of the high temperature with the colored resin particles in the dispersion is lowered.

When the inert gas is continuously blown, a strainer arranged in the blowing tube is easy to cause clogging. However, when the method of putting the inert gas and saturated steam together to blow them from one blowing tube is adopted, the clogging of the strainer can be relieved or prevented without lowering the function thereof. According to this method, an already existing evaporator, in which one blowing tube has been arranged, can be used, which is economical and also useful in retaining the strength of the evaporator.

(3) Collecting Step

The colored resin particles are collected from the dispersion after the stripping treatment step described above. The collection of the colored resin particles is conducted by dehydrating, washing, filtering and drying treatments in accordance with a method known per se in the art, whereby dry colored resin particles are collected. Prior to the dehydration, for example, a treatment such as acid washing or alkali washing according to the kind of the dispersion stabilizer used is conducted for the purpose of solubilizing and removing the dispersion stabilizer.

When an inorganic compound is used as the dispersion stabilizer, the above washing treatment is preferably conducted by a method in which an acid or alkali is added to the aqueous dispersion of colored resin particles so that the dispersion stabilizer is dissolved in water and removed. When colloid of a hardly water-soluble inorganic hydroxide is used as the dispersion stabilizer, the pH of the aqueous dispersion of colored resin particles is preferably adjusted to 6.5 or less by adding an acid. Examples of the acid to be added include inorganic acids such as sulfuric acid, hydrochloric acid, and nitric acid and organic acids such as formic acid and acetic acid. Particularly, sulfuric acid is suitable for high removal efficiency and low impact on production facilities.

The methods of the dehydrating and filtering are not particularly limited, and various known methods can be used. Examples of such methods include centrifugal filtration, vacuum filtration, and pressure filtration. Further, the method of the drying is not particularly limited, either, and various methods can be used.

(B) Pulverization Process

When a pulverization process is adopted to produce colored resin particles, the following process is conducted.

First, the binder resin, the wax, the charge control resin, the colorant, and another additive added if necessary, such as the molecular weight modifier, are mixed by means of a mixer such as a ball mill, a V-type mixer, an FM Mixer (trade name), a high-speed dissolver, or an internal mixer. Then, the thus obtained mixture is kneaded while heated by means of a pressure kneader, a twin-screw kneader, or a roller. The thus obtained kneaded product is coarsely pulverized by means of a pulverizer such as a hammer mill, a cutter mill, or a roller mill, and further finely pulverized by means of a pulverizer such as a jet mill or a high-speed rotary pulverizer, and then classified by means of a classifier such as a wind classifier or an airflow classifier to obtain colored resin particles having a desired particle diameter. In this way, colored resin particles produced by a pulverization process are obtained.

It is to be noted that the binder resin, the wax, the charge control resin, the colorant, and the another additive added if necessary, such as the molecular weight modifier, used in the pulverization process may be those mentioned above with reference to the suspension polymerization process (A). Similarly to the colored resin particles obtained by the suspension polymerization process (A), the colored resin particles obtained by the pulverization process may also be core-shell-type colored resin particles produced by an in-situ polymerization process or the like.

The binder resin may be another conventional resin widely used for toners. Specific examples of the binder resin used in the pulverization process include polystyrene, a styrene-butyl acrylate copolymer, a polyester resin, and an epoxy resin.

2. Colored Resin Particles

Colored resin particles are obtained by the above production process such as the suspension polymerization process (A) or the pulverization process (B).

Hereinbelow, colored resin particles constituting the toner will be described. It is to be noted that the colored resin particles that will be described below include both core-shell-type colored resin particles and colored resin particles that are not of a core-shell type.

The volume average particle diameter (Dv) of the colored resin particles is preferably 4 to 12 μm, more preferably 5 to 10 μm. If the Dv is less than 4 μm, there is a case where the flowability of the toner is reduced, transferability is deteriorated, or image density is reduced. If the Dv exceeds 12 μm, there is a case where image resolution is reduced.

The ratio of the volume average particle diameter (Dv) to the number average particle diameter (Dn) (Dv/Dn) of the colored resin particles is preferably 1.0 to 1.3, more preferably 1.0 to 1.2. If the Dv/Dn exceeds 1.3, there is a case where transferability, image density, and resolution are reduced. The volume average particle diameter and number average particle diameter of the colored resin particles can be measured by means of, for example, a particle diameter analyzer (manufactured by Beckman Coulter, Inc., trade name: MULTISIZER).

The average circularity of the colored resin particles used in the present invention is preferably 0.96 to 1.00, more preferably 0.97 to 1.00, even more preferably 0.98 to 1.00 from the viewpoint of image reproducibility.

If the average circularity of the colored resin particles is less than 0.96, there is a case where thin-line reproducibility of printing is deteriorated.

In the present invention, the circularity is defined as a value obtained by dividing the perimeter of a circle having the same projected area as the image of a particle by the perimeter of projection image of the particle. In the present invention, the average circularity is used as a simple method for quantitatively representing the shape of particles, and is an indicator representing the degree of roughness of the colored resin particles. When the colored resin particles are perfectly spherical, the average circularity is 1, and when the colored resin particles have a more complex surface shape, the average circularity is smaller.

3. Process for Producing Toner

In the present invention, an external addition treatment is preferably conducted by mixing the colored resin particles with an external additive by means of agitation to attach the external additive to the surface of the colored resin particles to provide a one-component toner (developer). It is to be noted that the one-component toner may further be mixed with carrier particles by agitation to provide a two-component developer.

An agitator that conducts the external addition treatment is not particularly limited as long as the external additive can be attached to the surface of the colored resin particles. The external addition treatment can be conducted by means of an agitator capable of conducting mixing and agitation, such as an FM Mixer (trade name, manufactured by NIPPON COKE & ENGINEERING CO., LTD.), a Super Mixer (trade name, manufactured by KAWATA MFG CO., LTD.), a Q Mixer (trade name, manufactured by NIPPON COKE & ENGINEERING CO., LTD.), a Mechanofusion System (trade name, manufactured by HOSOKAWA MICRON CORPORATION), and a MECHANOMILL (trade name, manufactured by OKADA SEIKO CO., LTD.)

Examples of the external additive include: inorganic fine particles made of silica, titanium oxide, aluminum oxide, zinc oxide, tin oxide, calcium carbonate, calcium phosphate, and/or cerium oxide; and organic fine particles made of a polymethyl methacrylate resin, a silicone resin, and/or a melamine resin. Among them, inorganic fine particles are preferred. Among these inorganic fine particles, silica and/or titanium oxide are/is preferred, and fine particles made of silica are particularly suitable.

These external additives may be used alone or in combination of two or more of them. Particularly, two or more kinds of silica different in particle diameter are preferably used in combination.

In the present invention, it is desirable that the proportion of the external additive to be used is usually 0.05 to 6 parts by mass, preferably 0.2 to 5 parts by mass with respect to 100 parts by mass of the colored resin particles. If the amount of the external additive added is less than 0.05 parts by mass, there is a case where the toner remains even after transfer. If the amount of the external additive added exceeds 6 parts by mass, there is a case where fog occurs.

4. Toner According to the Present Invention

The toner according to the present invention obtained through the above steps has a total volatile organic component (TVOC) content reduced to a low level, has improved environmental charge stability, is less likely to cause fog even when used in either a low-temperature and low-humidity (L/L) environment or a high-temperature and high-humidity (H/H) environment, does not cause filming even in continuous printing, and exhibits excellent printing durability.

EXAMPLES

The present invention will hereinafter be described in more detail by the following Examples and Comparative Examples. However, the present invention is not limited to the following examples only. All designations of part(s) and % are expressed on mass basis, unless otherwise noted.

Test methods carried out on Examples and Comparative Examples are as follows.

1. Production of Charge Control Resin

Synthesis Example 1

A polymerizable monomer of 100 parts containing 88% of styrene, 10% of butyl acrylate, and 2% of an N,N-diethyl-N-methyl-N-(2-methacryloylethyl)ammonium p-toluenesulfonic acid unit was put into a mixed solvent containing 500 parts of toluene and 400 parts of methanol and reacted at 80° C. in the presence of 4 parts of 2,2'-azobisdimethylvaleronitrile for 8 hours. After the completion of the reaction, the solvent was distilled away to obtain a quaternary ammonium salt group-containing copolymer (hereinafter, referred to as a positively-chargeable charge control resin 1). The obtained positively-chargeable charge control resin 1 had a weight-average molecular weight of $1.2 \times 10^4$, a glass transition temperature of 76° C., and a base number of 0.3 mgHCl/g.

Synthesis Example 2

A polymerizable monomer of 100 parts containing 85% of styrene, 11% of butyl acrylate, and 4% of an N,N-diethyl-N-methyl-N-(2-methacryloylethyl)ammonium p-toluenesulfonic acid unit was put into a mixed solvent containing 500 parts of toluene and 400 parts of methanol and reacted at 80° C. in the presence of 4 parts of 2,2'-azobisdimethylvaleronitrile for 8 hours. After the completion of the reaction, the solvent was distilled away to obtain a quaternary ammonium salt group-containing copolymer (hereinafter, referred to as a positively-chargeable charge control resin 2). The obtained positively-chargeable charge control resin 2 had a weight-average molecular weight of $1.2\times10^4$, a glass transition temperature of 73° C., and a base number of 0.4 mgHCl/g.

Production Example 1

The positively-chargeable charge control resin 1 synthesized in Synthesis Example 1 was spread on a tray and vacuum-dried for 10 hours under conditions of a temperature of 55° C. and a pressure of 1.3 kPa to obtain a charge control resin A. The properties of the obtained charge control resin A are shown in Table 1.

Production Example 2

A charge control resin B was obtained in the same manner as in Production Example 1 except that the positively-chargeable charge control resin 1 synthesized in Synthesis Example 1 was changed to the positively-chargeable charge control resin 2 synthesized in Synthesis Example 2. The properties of the obtained charge control resin B are shown in Table 1.

Production Example 3

A charge control resin C was obtained in the same manner as in Production Example 1 except that the time of drying was changed from 10 hours to 2 hours. The properties of the obtained charge control resin C are shown in Table 1.

Production Example 4

A charge control resin F was obtained in the same manner as in Production Example 1 except that the temperature of drying was changed from 55° C. to 40° C. The properties of the obtained charge control resin F are shown in Table 1.

Production Example 5

A charge control resin G was obtained in the same manner as in Production Example 1 except that the temperature of drying was changed from 55° C. to 70° C. and the time of drying was changed from 10 hours to 30 minutes. The properties of the obtained charge control resin G are shown in Table 1.

Production Example 6

A charge control resin H was obtained in the same manner as in Production Example 1 except that the temperature of drying was changed from 55° C. to 70° C. and the time of drying was changed from 10 hours to 1 hour. The properties of the obtained charge control resin H are shown in Table 1.

2. Properties of Charge Control Resin

The amount of each volatile organic compound contained in the charge control resins A to H was measured under the following conditions. In Examples, the positively-chargeable charge control resin 1 left untreated after synthesis in Synthesis Example 1 was defined as a charge control resin D, and the positively-chargeable charge control resin 2 left untreated after synthesis in Synthesis Example 2 was defined as a charge control resin E.

(1) The charge control resin of 3 g was precisely weighed and placed in a 100-mL container, and then 27 g of dimethylformamide was added thereto. The resulting mixture was stirred by means of a stirrer for 1 hour to dissolve the charge control resin.

(2) Then, 13 g of methanol was further added to the solution, and the stirring was continued for 10 minutes to deposit a polymer component. Then, the stirring was stopped to settle the deposit.

(3) The supernatant was withdrawn into a syringe. A filter (product of ADVANTEC, trade name: MEMBRANE FILTER 25JP020AN) was attached to the syringe to filter the supernatant. Then, the filtrate was measured by means of a gas chromatograph under the following measurement conditions.

(4) Detection peaks other than dimethylformamide and methanol were regarded as volatile organic compounds, and the amount of a volatile organic compound (ppm) per unit mass of the charge control resin was determined in terms of styrene using a calibration curve previously prepared using styrene.

(Measurement Conditions)

Apparatus: GC-2010 (manufactured by SHIMADZU CORPORATION)

Column: TC-WAX (manufactured by GL Sciences Inc.) df=0.5 μm, 0.25 mm I.D.×60 m

Detector: FID

Carrier Gas: Helium (linear velocity: 21.3 cm/sec)

Inlet Temperature: 200° C.

Detector Temperature: 200° C.

Oven Temperature: kept at 100° C. for 2 minutes, increased to 150° C. at a rate of 5° C./min, and kept at 150° C. for 6 minutes Sampling Amount: 2 μL The properties of the charge control resins A to H are shown in Table 1. In the following Table 1, "C5 to C9" means the amount of volatile organic compounds detected in a range of a peak detecting time of hydrocarbons having 5 to 9 carbons (first total amount of components) determined in terms of styrene, "C10 to C18" means the amount of volatile organic compounds detected in a range of a peak detecting time of hydrocarbons having 10 to 18 carbons (second total amount of components) determined in terms of styrene, and "maximum peak" means the amount of a volatile organic compound corresponding to a maximum peak of peaks of hydrocarbons having 10 to 18 carbons determined in terms of styrene.

TABLE 1

| charge control resin | A | B | C | D | E | F | G | H |
|---|---|---|---|---|---|---|---|---|
| C5 to C9 [ppm] | 300 | 280 | 420 | 1300 | 1500 | 340 | 800 | 580 |
| C10 to C18 [ppm] | 500 | 1000 | 4100 | 10000 | 11200 | 8100 | 4400 | 3200 |
| Maximum peak [ppm] | 100 | 300 | 2800 | 8800 | 9000 | 6600 | 3800 | 1600 |

3. Production of Toner

Example 1

A polymerizable monomer mixture was obtained by dispersing 75 parts of styrene and 25 parts of n-butyl acrylate as polymerizable monomers and 5 parts of carbon black (product of Mitsubishi Chemical Corporation, trade name: #25B) as a black colorant in a bead mill. This mixture was mixed with and dissolved in 4 parts of the charge control resin A subjected to a refining treatment, 5 parts of a fatty acid ester wax (product of NOF CORPORATION, trade name: WEP7) as a wax, 0.3 part of a polymethacrylate macromonomer (product of TOAGOSEI CO., LTD., trade name: AA6), 0.6 part of divinyl benzene as a crosslinkable polymerizable monomer, and 1.6 parts of t-dodecylmercaptane as a molecular weight modifier to prepare a polymerizable monomer composition.

An aqueous solution with 6.2 parts of sodium hydroxide dissolved in 50 parts of ion-exchanged water was added to an aqueous solution with 10.2 parts of magnesium chloride dissolved in 250 parts of ion-exchanged water under stirring to form colloid of magnesium hydroxide, which was colloid of a hardly water-soluble metal hydroxide, thereby preparing an aqueous dispersion medium.

The polymerizable monomer composition was poured into the aqueous dispersion medium containing the magnesium hydroxide colloid obtained above, and the mixture was stirred. After 4.4 parts of t-butylperoxy diethyl butanoate was then added as a polymerization initiator to the aqueous dispersion medium, the resultant dispersion was stirred under high shear for 10 minutes at a rotation speed of 15,000 rpm by means of an in-line type emulsifying and dispersing machine (manufactured by Pacific Machinery & Engineering Co., Ltd., trade name: MILDER) to form fine droplets of the polymerizable monomer composition in the aqueous dispersion medium. In such a manner, an aqueous dispersion with the droplets of the polymerizable monomer composition dispersed therein was prepared.

A reactor equipped with agitating blades was charged with the aqueous dispersion with the droplets of the polymerizable monomer composition dispersed therein, and the temperature was raised to 90° C. to conduct a polymerization reaction. When a conversion into a polymer reached almost 100%, 1 part of methyl methacrylate as a polymerizable monomer for shell and 0.3 part of 2,2'-azobis(2-methyl-N-(2-hydroxyethyl)-propionamide) (product of Wako Pure Chemical Industries, Ltd., trade name: VA-086) as a polymerization initiator for shell dissolved in 10 parts of ion-exchanged water were added, and the polymerization was continued at 90° C. for 4 hours. Then, the reaction mixture was cooled to stop the reaction, thereby obtaining an aqueous dispersion containing core-shell type colored resin particles formed (hereinafter referred to as "colored resin particle dispersion").

The system illustrated in FIGURE was used to subject the colored resin particle dispersion obtained to a stripping treatment. A microwave type level meter (manufactured by TOKIMEC INC., trademark: LEVELPRO RTG 40) was provided at an upper portion within an evaporator 1, and this was used as a non-contact type bubble level meter 3. After the colored resin particle dispersion was diluted to a solid content concentration of 20% with ion-exchanged water, the diluted dispersion was fed to the evaporator 1.

Into the evaporator 1 were added 0.1 part of a defoaming agent (product of SAN NOPCO LIMITED, trade name: SN DEFOAMER 180, registered trademark; an emulsified product of oils and fats, a polyoxyalkylene type nonionic surfactant, etc.) and 10 parts of the same aqueous dispersion medium as the aqueous dispersion medium prepared described above. Nitrogen gas was introduced into the evaporator 1 to purge a vapor phase thereof with the nitrogen gas. After the colored resin particle dispersion was then heated up to 75° C. while agitating at an agitating speed of 20 rpm by agitating blades 2, a blower 12 was started. At this time, the level of the dispersion within the evaporator was 60%.

Nitrogen gas was heated to 80° C. by a heater to adjust the flow rate of the nitrogen gas to 1.0 L/(hr-kg). Steam of 100° C. (saturated steam) was adjusted in such a manner that the flow rate thereof became 0.1 kg/(hr-kg). A confluent gas of the steam and nitrogen gas was introduced into the colored resin particle dispersion from a blowing tube (gas inlet) 14 of a straight type to start a stripping treatment. The confluent gas blown was guided to a condenser 7 through a gas line 6.

The stripping treatment was conducted under conditions that the temperature of the colored resin particle dispersion was 75° C., the pressure of the vapor phase within the evaporator 1 was 60 kPa, and the flow rate of the nitrogen gas in the former half of the stripping treatment step (average flow rate in the former half of the time during which the stripping treatment step was conducted) was 1.0 L/(hr-kg). Since the level of a bubble layer on the liquid level of the dispersion went down as the treatment time elapsed, the flow rate of the nitrogen gas was increased step by step. The flow rate of the nitrogen gas in the latter half of the stripping treatment step was controlled to 3.0 L/(hr-kg). With the increase of the flow rate of the nitrogen gas, the flow rate of the nitrogen gas was controlled in such a manner that the bubble level was under bubble level conditions (at most 95%) staying in the vapor phase within the evaporator, and was preferably a bubble level (at least 90%) that was within a range causing no inconvenience in operation and could retain a high removing capability.

While controlling the flow rate of the nitrogen gas in this manner, the stripping treatment step was conducted for 5.5 hours. Thereafter, the resultant aqueous dispersion was cooled to 25° C. Colored resin particles obtained after the stripping treatment step were sampled to measure a TVOC content at the time the stripping had been completed.

After completion of the stripping treatment step, sulfuric acid was added while agitating the dispersion of the colored resin particles to conduct acid washing (at 25° C. for 10 minutes), thereby adjusting the pH of the dispersion to 4.5 or lower. This dispersion was dehydrated and washed by means of a continuous belt filter (manufactured by Sumitomo Heavy Industries, Ltd., trade name: EAGLE FILTER) to filter and separate solids. The solids were dried at 45° C. for 10 hours by a dryer to obtain colored resin particles (core-shell type colored resin particles) having a volume average particle diameter Dv of 7.4 µm and a particle diameter distribution Dv/Dn of 1.12.

To 100 parts of the dried colored resin particles were added 1.0 part of hydrophobized silica having an average primary particle diameter of 50 nm and 0.8 part of hydrophobized silica having an average primary particle diameter of 20 nm, and these components were mixed by agitation by means of a high-speed agitator (manufactured by NIPPON COKE & ENGINEERING CO., LTD., trade name: FM Mixer) having a cooling jacket to conduct an external addition treatment to obtain a toner of Example 1.

Examples 2 to 5 and Comparative Examples 1 to 5

Toners of Examples 2 to 5 and Comparative Examples 1 to 5 were obtained in the same manner as in Example 1 except that the type of charge control resin used and the amount of the charge control resin added were changed as shown in Table 2.

Example 6

Styrene-butyl acrylate copolymer (weight average molecular weight 10,000) 100 parts Carbon black (product of Mitsubishi Chemical Corporation, trade name: #25B) 5 parts Charge control resin A subjected to refining treatment 15 parts Fatty acid ester wax (product of NOF CORPORATION, trade name: WEPT) 8 parts The styrene-butyl acrylate copolymer used as a binder resin was one that had been passed through a screen having an opening of 2 mm.

A total of 120 kg of the raw materials according to the above formula were put into a Nauta mixer and mixed for 2 hours, and the resulting mixture was then dry-dispersed by trituration by means of a Mix Muller (trade name, manufactured by SHINTOKOGIO, LTD.). The mixture was kneaded by means of an extruder (manufactured by Ikegai Corp, trade name: PCM-30) under conditions where a barrel preset temperature was 120° C. and a main shaft rotation speed was 250 rpm. The kneaded product was cooled and then coarsely pulverized by means of a speed mill having a 2 mmϕ, screen.

Then, the coarsely-pulverized product was pulverized by means of an I-type jet mill, and then a fine powder and a coarse powder were separated by means of an Elbow-Jet Air Classifier to obtain colored resin particles having a volume average particle diameter of 8.2 μm.

Then, an external addition treatment was conducted by adding 1.0 part of silica having an average primary particle diameter of 50 nm and 0.8 part of silica having an average primary particle diameter of 20 nm to 100 parts of the colored resin particles obtained above and mixing them by agitation by means of a high-speed mixer having a cooling jacket (manufactured by NIPPON COKE & ENGINEERING CO., LTD., trade name: FM Mixer) to obtain a toner of Example 6.

4. Evaluation of Properties of Colored Resin Particles and Toners

The properties of the toners of Examples 1 to 6 and Comparative Examples 1 to 5 and the colored resin particles used in the toners were examined. The details are as follows.

(1) Measurement of Particle Diameter of Colored Resin Particles

The volume average particle diameter Dv, number average particle diameter Dn, and particle diameter distribution Dv/Dn of each colored resin particle were measured by means of a particle size meter (manufactured by Beckmann Coulter, Inc., trade name: MULTISIZER). The measurement by means of a MULTISIZER was conducted under conditions of an aperture diameter: 100 μm, a dispersion medium: isothone II (trade name), a concentration: 10% and the number of particles measured: 100,000 particles.

More specifically, 0.2 g of the colored resin particle sample was placed in a beaker, and an aqueous alkyl benzenesulfonic acid solution (product of FUJIFILM Corporation, trade name: DRIWEL) was added thereto as a dispersing agent. Then, 2 mL of a dispersion medium was further added thereto to moisten the colored resin particles. Then, 10 mL of the dispersion medium was added, and the colored resin particles were dispersed for 1 minute by means of an ultrasonic disperser to conduct measurement by means of the above particle size meter.

(2) Amount of Total Volatile Organic Components (TVOCs)

A black-and-white printer filled with a toner to be measured was placed in a measurement chamber having a space in which printing using the printer could be conducted, and a pattern for BAM test was printed for 10 minutes in an environment of 23° C. in temperature and 50% RH in humidity while the chamber was ventilated.

Suction was started at the same time as the start of printing to measure TVOCs. The measured value of TVOCs was defined as a TVOC value inherent in each toner sample.

5. Evaluation of Printing Using Toner

Printing using each of the toners of Examples 1 to 6 and Comparative Examples 1 to 5 was evaluated. The details are as follows.

(1) Initial Fog Test

Printing paper was set in a commercially-available printer (printing speed: 28 sheets/min) of a nonmagnetic one-component development system, and the toner was charged into the printer. The printer was left to stand for 24 hours under a high-temperature and high-humidity (H/H) environment of 35° C. in temperature and 80% RH in humidity. Then, under the same environment, continuous printing was conducted on 3 paper sheets at a printing density of 5%.

Then, white solid printing (printing density 0%) was conducted, and the printer was stopped in the middle of the white solid printing. The toner remaining in a non-image area on a photosensitive member after development was attached to an adhesive tape (product of Sumitomo 3M Limited, trade name: SCOTCH MENDING TAPE 810-3-18). This adhesive tape was attached on printing paper. Then, the whiteness (B) of the printing paper with the adhesive tape was measured by means of a whiteness colorimeter (manufactured by NIPPON DENSHOKU INDUSTRIES CO., LTD.), and only an unused adhesive tape was attached on printing paper likewise, and the whiteness (A) of the printing paper with the tape was measured. The difference of the whiteness (B-A) was defined as a fog value. The smaller fog value indicates that fog is less, and printing is better.

Likewise, the initial fog test was conducted also under a low-temperature and low-humidity (L/L) environment of 10° C. in temperature and 10% RH in humidity.

(2) Printing Durability

Printing paper was set in the same printer as used in "(1) Initial Fog Test", and the toner was charged into the printer. The printer was left to stand for 24 hours under a normal-temperature and normal-humidity (N/N) environment of 23° C. in temperature and 50% RH in humidity. Then, under the same environment, continuous printing was conducted at a printing density of 5%. Black solid printing (printing density 100%) was conducted every 500 sheets of paper, and the printing density of a solid printed area was measured by means of a reflective image densitometer (manufactured by Macbeth, trade name: RD918).

Then, white solid printing (printing density 0%) was further conducted, and the printer was stopped in the middle of the white solid printing. The toner remaining in a non-image area on a photosensitive member after development was attached to an adhesive tape (product of Sumitomo 3M Limited, trade name: SCOTCH MENDING TAPE 810-3-18). This adhesive tape was attached on printing paper. Then, the whiteness (B) of the printing paper with the adhesive tape was measured by means of a whiteness colorimeter (manufactured by NIPPON DENSHOKU INDUSTRIES CO., LTD.), and only an unused adhesive tape was attached on printing paper, and the whiteness (A) of the printing paper with the tape was measured likewise. The difference of the whiteness (B-A) was defined as a fog value.

A continuous printing test was conducted until 15,000 sheets of paper were printed to determine the number of paper sheets that could be continuously printed while image quality was maintained so that the printing density when black solid printing was conducted was 1.3 or more and the fog value when white solid printing was conducted was 1 or less. The test result represented by "15000<" means that the above requirements are satisfied even when printing is continuously conducted on 15,000 sheets of paper.

(3) Filming

Continuous printing was conducted using the above printer at a printing density of 5% under a normal-temperature and normal-humidity (N/N) environment, and a printed sheet of paper was observed every 2,000 printed sheets of paper. When image deterioration such as fog or blur occurred, the toner was once discharged at this timing, and the new toner was again charged, and then printing was continued until filming occurred or the number of printed paper sheets reached 50,000.

The number of printed paper sheets at the time when a linear stain (streak) or a dot stain (black spot) was started to appear in an image area on a sheet of paper due to the occurrence of filming on a developing blade, a photosensitive member, or the like was counted. When a stain appeared on an image area, the toner in the developer was discharged, and was then again charged to conduct printing again on 100 sheets of paper. When a linear stain (streak) or a dot stain (black spot) did not disappear in an image area on a sheet of paper, it was judged that filming had occurred.

The test was conducted until 50,000 sheets of paper were printed. The test result represented by "50000<" means that neither a streak nor a black spot appeared even in continuous printing of 50,000 sheets of paper.

The measurement and evaluation results of the toners of Examples 1 to 6 and Comparative Examples 1 to 5 are shown in Table 2. It is to be noted that in Table 2, "HH initial fog" and "LL initial fog" mean a fog value determined in the initial fog test under a high-temperature and high-humidity (H/H) environment and a fog value determined in the initial fog test under a low-temperature and low-humidity (L/L) environment, respectively.

and 2, the toner of Comparative Example 1 contains 4.0 parts of the charge control resin D whose content of volatile organic compounds detected in a range of a peak detecting time of hydrocarbons having 5 to 9 carbons (in terms of styrene; hereinafter, also referred to as a first total amount of components) is 1,300 ppm, whose content of volatile organic compounds detected in a range of a peak detecting time of hydrocarbons having 10 to 18 carbons (in terms of styrene; hereinafter, also referred to as a second total amount of components) is 10,000 ppm, and whose amount of a component corresponding to a maximum peak of peaks of hydrocarbons having 10 to 18 carbons (in terms of styrene; hereinafter, also referred to as an amount of a maximum peak component) is 8,800 ppm.

As can be seen from Table 2, in the case of the toner of Comparative Example 1, the number of printed paper sheets determined to evaluate printing durability exceeds 15,000, the initial fog value under a high-temperature and high-humidity (H/H) environment is 1.2, and the initial fog value under a low-temperature and low-humidity (L/L) environment is 0.3. Therefore, the toner of Comparative Example 1 has no problem with at least printing durability and initial fog.

However, in the case of the toner of Comparative Example 1, the amount of TVOCs is as large as 9.0 (mg/h), and the number of printed paper sheets determined for evaluation in the filming test is as small as 25,000. Particularly, the amount of TVOCs of the toner of Comparative Example 1 is the largest among the toners evaluated this time. Further, the number of printed paper sheets determined for evaluation in the filming test is the smallest among the toners evaluated this time.

As can be seen from above, the toner of Comparative Example 1 containing a conventional charge control resin

TABLE 2

| | | Example 1 | Example 2 | Example 3 | Example 4 | Example 5 | Example 6 |
|---|---|---|---|---|---|---|---|
| charge control resin | Type | A | A | A | B | C | A |
| | Added amount [part] | 4.0 | 8.0 | 2.0 | 3.0 | 4.0 | 15.0 |
| TVOC [mg/hr] | | 3.1 | 3.4 | 3.0 | 3.8 | 5.9 | 5.7 |
| Printing test | Filming [sheets] | 50000< | 50000< | 50000< | 50000< | 45000 | 45000 |
| | Printing durability [sheets] | 15000< | 15000< | 13500 | 14500 | 15000< | 15000< |
| | HH initial fog | 0.3 | 0.2 | 1.7 | 0.2 | 0.3 | 1.3 |
| | LL initial fog | 0.4 | 1.2 | 0.2 | 0.8 | 1.3 | 0.6 |

| | | Comparative Example 1 | Comparative Example 2 | Comparative Example 3 | Comparative Example 4 | Comparative Example 5 |
|---|---|---|---|---|---|---|
| charge control resin | Type | D | E | F | G | H |
| | Added amount [part] | 4.0 | 3.0 | 4.0 | 4.0 | 4.0 |
| TVOC [mg/hr] | | 9.0 | 8.1 | 4.3 | 7.9 | 7.2 |
| Printing test | Filming [sheets] | 25000 | 25000 | 30000 | 35000 | 45000 |
| | Printing durability [sheets] | 15000< | 14000 | 15000< | 15000< | 15000< |
| | HH initial fog | 1.2 | 1.5 | 0.4 | 0.6 | 0.4 |
| | LL initial fog | 0.3 | 0.5 | 2.1 | 1.9 | 0.7 |

6. Summary of Toner Evaluations

Hereinbelow, the toner evaluations will be reviewed with reference to Tables 1 and 2. First, the toner of Comparative Example 1 will be reviewed. As can be seen from Tables 1 whose first total amount of components, second total amount of components, and amount of a maximum peak component are all too much is likely to generate TVOCs and to cause filming.

Next, the toner of Comparative Example 2 will be reviewed. As can be seen from Tables 1 and 2, the toner of Comparative Example 2 contains 3.0 parts of the charge control resin E whose first total amount of components is 1,500 ppm, second total amount of components is 11,200 ppm, and amount of a maximum peak component is 9,000 ppm.

As can be seen from Table 2, in the case of the toner of Comparative Example 2, the number of printed paper sheets determined to evaluate printing durability is 14,000, the initial fog value under a high-temperature and high-humidity (H/H) environment is 1.5, and the initial fog value under a low-temperature and low-humidity (L/L) environment is 0.5. Therefore, the toner of Comparative Example 2 has no problem with at least printing durability and initial fog.

However, in the case of the toner of Comparative Example 2, the amount of TVOCs is as large as 8.1 (mg/h), and the number of printed paper sheets determined for evaluation in the filming test is as small as 25,000. Particularly, the number of printed paper sheets determined for evaluation in the filming test is the smallest among the toners evaluated this time.

As can be seen from above, the toner of Comparative Example 2 containing a conventional charge control resin whose first total amount of components, second total amount of components, and amount of a maximum peak component are all too much is likely to generate TVOCs and to cause filming.

Next, the toner of Comparative Example 3 will be reviewed. As can be seen from Tables 1 and 2, the toner of Comparative Example 3 contains 4.0 parts of the charge control resin F whose first total amount of components is 340 ppm, second total amount of components is 8,100 ppm, and amount of a maximum peak component is 6,600 ppm.

As can be seen from Table 2, in the case of the toner of Comparative Example 3, the amount of TVOCs is 4.3 (mg/h), the number of printed paper sheets determined to evaluate printing durability exceeds 15,000, and the initial fog value under a high-temperature and high-humidity (H/H) environment is 0.4. Therefore, the toner of Comparative Example 3 has no problem with generation of TVOCs, printing durability, and initial fog under a high-temperature and high-humidity (H/H) environment.

However, in the case of the toner of Comparative Example 3, the number of printed paper sheets determined for evaluation in the filming test is as small as 30,000, and the initial fog value under a low-temperature and low-humidity (L/L) environment is as high as 2.1. Particularly, the initial fog value under a low-temperature and low-humidity (L/L) environment is the highest among the toners evaluated this time.

As can be seen from above, the toner of Comparative Example 3 containing a charge control resin whose second total amount of components exceeds 5,000 ppm and amount of a maximum peak component exceeds 3,000 ppm is likely to cause filming, and is particularly likely to cause initial fog under a low-temperature and low-humidity (L/L) environment.

Next, the toner of Comparative Example 4 will be reviewed. As can be seen from Tables 1 and 2, the toner of Comparative Example 4 contains 4.0 parts of the charge control resin G whose first total amount of components is 800 ppm, second total amount of components is 4,400 ppm, and amount of a maximum peak component is 3,800 ppm.

As can be seen from Table 2, in the case of the toner of Comparative Example 4, the number of printed paper sheets determined to evaluate printing durability exceeds 15,000, and the initial fog value under a high-temperature and high-humidity (H/H) environment is 0.6. Therefore, the toner of Comparative Example 4 has no problem with at least printing durability and initial fog under a high-temperature and high-humidity (H/H) environment.

However, in the case of the toner of Comparative Example 4, the amount of TVOCs is as high as 7.9 (mg/h), the number of printed paper sheets determined for evaluation in the filming test is as small as 35,000, and the initial fog value under a low-temperature and low-humidity (L/L) environment is as high as 1.9.

As can be seen from above, the toner of Comparative Example 4 containing a charge control resin whose first total amount of components exceeds 500 ppm and amount of a maximum peak component exceeds 3,000 ppm is likely to generate TVOCs, to cause filming, and to cause initial fog under a low-temperature and low-humidity (L/L) environment.

Next, the toner of Comparative Example 5 will be reviewed. As can be seen from Tables 1 and 2, the toner of Comparative Example 5 contains 4.0 parts of the charge control resin H whose first total amount of components is 580 ppm, second total amount of components is 3,200 ppm, and amount of a maximum peak component is 1,600 ppm.

As can be seen from Table 2, in the case of the toner of Comparative Example 5, the number of printed paper sheets determined for evaluation in the filming test is 45,000, the number of printed paper sheets determined to evaluate printing durability exceeds 15,000, the initial fog value under a high-temperature and high-humidity (H/H) environment is 0.4, and the initial fog value under a low-temperature and low-humidity (L/L) environment is 0.7. Therefore, the toner of Comparative Example 5 has no problem with at least filming, printing durability and initial fog.

However, in the case of the toner of Comparative Example 5, the amount of TVOCs is as large as 7.2 (mg/h).

As can be seen from above, the toner of Comparative Example 5 containing a charge control resin whose first total amount of components exceeds 500 ppm is likely to generate TVOCs.

On the other hand, as can be seen from Tables 1 and 2, each of the toners of Examples 1 to 6 contains 2.0 to 15.0 parts of the charge control resin A, B, or C whose first total amount of components is 280 to 420 ppm, second total amount of components is 500 to 4,100 ppm, and amount of a maximum peak component is 100 to 2,800 ppm.

As can be seen from Table 2, in the case of the toners of Examples 1 to 6, the amount of TVOCs is as small as 3.0 to 5.9 (mg/h), the number of printed paper sheets determined for evaluation in the filming test is as large as 45,000 or more, the number of printed paper sheets determined to evaluate printing durability is as large as 13,500 or more, the initial fog value under a high-temperature and high-humidity (H/H) environment is as low as 0.2 to 1.7, and the initial fog value under a low-temperature and low-humidity (L/L) environment is as low as 0.2 to 1.3.

Therefore, the toners of Examples 1 to 6 containing a charge control resin whose first total amount of components is 500 ppm or less, second total amount of components is 5,000 ppm or less, and amount of a maximum peak component is 3,000 ppm or less have a TVOC content reduced to a low level, have improved environmental charge stability, are less likely to cause fog even when used in either a low-temperature and low-humidity (L/L) environment or a high-temperature and high-humidity (H/H) environment, are less likely to cause filming even in continuous printing, and can exhibit excellent printing durability.

REFERENCE SIGNS LIST

1: Evaporator
2: Agitating blade
3: Non-contact type bubble level meter
4: Pressure gauge
5: Thermometer
6: Gas line
7: Condenser
8: Condensing tank
9: Gas line
10: Volatile substance-removing device
11: Gas line
12: Blower
13: Inlet line of inert gas and saturated steam
14: Blowing tube
15: Valve
16: Nitrogen gas source
17: Steam (saturated steam) source

The invention claimed is:

1. A method for producing a toner comprising combining a binder resin, a wax, a positively-chargeable charge control resin and a colorant to form the toner,
   prior to said combining, the positively-chargeable charge control resin is obtained by drying treatment conducted for 2 to 24 hours under conditions of a drying temperature of 55 to 80° C. and a pressure of 0.5 to 20 kPa,
   wherein the positively-chargeable charge control resin comprises a monomer unit having a functional group that imparts a positive charging property, a vinyl aromatic hydrocarbon monomer unit, and a (meth)acrylate monomer unit,
   wherein, as a result of gas chromatography analysis of a supernatant obtained by dissolving the positively-chargeable charge control resin in a first organic solvent to prepare a positively-chargeable charge control resin solution and then adding a second organic solvent to the positively-chargeable charge control resin solution to precipitate a polymer component and to obtain the supernatant,
   a first total amount of components detected in a range of a peak detecting time of hydrocarbons having 5 to 9 carbons is 500 ppm or less in terms of styrene;
   a second total amount of components detected in a range of a peak detecting time of hydrocarbons having 10 to 18 carbons is 5,000 ppm or less in terms of styrene; and
   an amount of a component corresponding to a maximum peak of peaks of hydrocarbons having 10 to 18 carbons is 3,000 ppm or less in terms of styrene.

2. The method for producing a toner according to claim 1, wherein a content of the positively-chargeable charge control resin is 0.3 to 20 parts by mass, with respect to 100 parts by mass of the binder resin.

3. The method for producing a toner according to claim 1, wherein the positively-chargeable charge control resin is obtained by polymerization using an azo compound as a polymerization initiator,
   wherein the azo compound is at least one selected from a group consisting of 4,4'-azobis(4-cyanovaleric acid), 2,2'-azobis[2-methyl-N-(2-hydroxyethyl)propionamide], 2,2'-azobis(2-amidinopropane) dihydrochloride, 2,2'-azobis(2,4-dimethylvaleronitrile) and 2,2'-azobisisobutyronitrile.

* * * * *